(12) United States Patent
Tsurumi

(10) Patent No.: US 11,348,326 B2
(45) Date of Patent: *May 31, 2022

(54) DISPLAY CONTROL DEVICE, DISPLAY CONTROL METHOD, AND RECORDING MEDIUM

(71) Applicant: SONY CORPORATION, Tokyo (JP)

(72) Inventor: Shingo Tsurumi, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/162,535

(22) Filed: Jan. 29, 2021

(65) Prior Publication Data

US 2021/0150823 A1   May 20, 2021

Related U.S. Application Data

(63) Continuation of application No. 16/927,665, filed on Jul. 13, 2020, now Pat. No. 10,922,902, which is a (Continued)

(30) Foreign Application Priority Data

Mar. 28, 2013   (JP) .............................. JP2013-068395

(51) Int. Cl.
  *G06T 19/20*   (2011.01)
  *G06F 3/01*   (2006.01)
  (Continued)

(52) U.S. Cl.
  CPC .............. *G06T 19/20* (2013.01); *G06F 3/011* (2013.01); *G06F 3/017* (2013.01);
  (Continued)

(58) Field of Classification Search
  CPC ...... G06F 3/011; G06F 3/017; G06F 3/04815; G06F 3/04883; G06T 19/006;
  (Continued)

(56) References Cited

U.S. PATENT DOCUMENTS 7,991,220 B2   8/2011   Nagai et al.
8,072,470 B2   12/2011   Marks
(Continued)

FOREIGN PATENT DOCUMENTS

CN   102693005 A   9/2012
CN   102750079 A   10/2012
(Continued)

OTHER PUBLICATIONS

Andrew J. Davison "Real-Time Simultaneous Localisation and Mapping with a Single Camera", Robotics Research Group, Dept, of Engineering Science, University of Oxford, Oct. 2003, 8 pages.

(Continued)

*Primary Examiner* — Tom V Sheng
(74) *Attorney, Agent, or Firm* — Paratus Law Group, PLLC

(57) ABSTRACT

There is provided a display control device including a display controller configured to place a virtual object within an augmented reality space corresponding to a real space in accordance with a recognition result of a real object shown in an image captured by an imaging part, and an operation acquisition part configured to acquire a user operation. When the user operation is a first operation, the display controller causes the virtual object to move within the augmented reality space.

18 Claims, 20 Drawing Sheets

Related U.S. Application Data continuation of application No. 15/855,377, filed on Dec. 27, 2017, now Pat. No. 10,733,807, which is a continuation of application No. 15/045,246, filed on Feb. 16, 2016, now Pat. No. 9,886,798, which is a continuation of application No. 14/169,474, filed on Jan. 31, 2014, now Pat. No. 9,261,954.

(51) Int. Cl.
    *G06F 3/04815*     (2022.01)
    *G06F 3/04883*     (2022.01)
    *G06T 7/70*     (2017.01)
    *G06T 19/00*     (2011.01)

(52) U.S. Cl.
    CPC ...... *G06F 3/04815* (2013.01); *G06F 3/04883* (2013.01); *G06T 7/70* (2017.01); *G06T 19/006* (2013.01)

(58) Field of Classification Search
    CPC ..... G06T 19/20; G06T 7/70; A63F 2300/105; A63F 2300/204; A63F 2300/69; A63F 2250/28; H04N 21/4223; G06K 9/0664; G06K 9/0671
    USPC .......................... 345/156, 173, 633; 382/312
    See application file for complete search history.

(56) References Cited

U.S. PATENT DOCUMENTS

| | | | |
|---|---|---|---|
| 8,872,854 | B1 | 10/2014 | Levitt |
| 8,933,931 | B2 | 1/2015 | Balan et al. |
| 9,165,405 | B2 | 10/2015 | Meier et al. |
| 9,261,954 | B2 | 2/2016 | Tsurumi |
| 9,886,798 | B2 | 2/2018 | Tsurumi |
| 10,922,902 | B2 * | 2/2021 | Tsurumi .................... G06T 7/70 |
| 2002/0075286 | A1 | 6/2002 | Yonezawa et al. |
| 2004/0021664 | A1 | 2/2004 | Takemoto et al. |
| 2004/0109009 | A1 | 6/2004 | Yonezawa et al. |
| 2004/0130579 | A1 | 7/2004 | Ishii et al. |
| 2008/0024523 | A1 | 1/2008 | Tomite et al. |
| 2008/0094417 | A1 | 4/2008 | Cohen |
| 2008/0100620 | A1 * | 5/2008 | Nagai .................. A63F 3/00643 345/424 |
| 2008/0111832 | A1 | 5/2008 | Emam et al. |
| 2009/0066690 | A1 | 3/2009 | Harrison |
| 2009/0066725 | A1 | 3/2009 | Nogami et al. |
| 2010/0134516 | A1 | 6/2010 | Cooper |
| 2011/0090252 | A1 | 4/2011 | Yoon et al. |
| 2011/0304611 | A1 | 12/2011 | Suzuki |
| 2011/0304639 | A1 * | 12/2011 | Noge .................... G06T 19/006 345/584 |
| 2011/0304711 | A1 | 12/2011 | Ito et al. |
| 2012/0030568 | A1 | 2/2012 | Migos et al. |
| 2012/0056992 | A1 | 3/2012 | Kuroda |
| 2012/0075424 | A1 | 3/2012 | Kawamoto et al. |
| 2012/0105473 | A1 * | 5/2012 | Bar-Zeev .................. G06T 7/70 345/633 |
| 2012/0212509 | A1 | 8/2012 | Benko et al. |
| 2012/0250940 | A1 | 10/2012 | Kasahara |
| 2012/0256956 | A1 | 10/2012 | Kasahara |
| 2012/0256961 | A1 * | 10/2012 | Ogasawara ........... A63F 13/213 345/659 |
| 2012/0293549 | A1 | 11/2012 | Osako |
| 2013/0095924 | A1 | 4/2013 | Geisner et al. |
| 2013/0022241 | A1 | 8/2013 | Kameyama et al. |
| 2013/0194304 | A1 | 8/2013 | Latta et al. |
| 2013/0222410 | A1 * | 8/2013 | Kameyama ........... G06T 19/006 345/589 |
| 2013/0293584 | A1 | 11/2013 | Anderson |
| 2013/0328762 | A1 | 12/2013 | McCulloch et al. |
| 2013/0335301 | A1 | 12/2013 | Wong et al. |
| 2013/0335405 | A1 | 12/2013 | Scavezze et al. |
| 2014/0009494 | A1 * | 1/2014 | Kasahara ........... G06K 9/00671 345/633 |
| 2014/0078175 | A1 | 3/2014 | Forutanpour et al. |
| 2014/0104274 | A1 * | 4/2014 | Hilliges .................. G06F 30/20 345/424 |
| 2014/0210858 | A1 | 7/2014 | Kim |
| 2014/0218361 | A1 * | 8/2014 | Abe ........................ A63F 13/42 345/424 |
| 2014/0267412 | A1 | 9/2014 | Calian et al. |
| 2014/0282220 | A1 | 9/2014 | Wantland et al. |
| 2014/0292809 | A1 | 10/2014 | Tsurumi |
| 2014/0300633 | A1 | 10/2014 | Sako et al. |
| 2014/0354686 | A1 | 12/2014 | Mullins |
| 2014/0375691 | A1 | 12/2014 | Kasahara |
| 2015/0022444 | A1 * | 1/2015 | Ooi .................... G06K 9/00671 345/156 |
| 2015/0029223 | A1 * | 1/2015 | Kaino .................... G09G 3/002 345/633 |
| 2015/0356787 | A1 | 12/2015 | Abe et al. |

FOREIGN PATENT DOCUMENTS

| | | | |
|---|---|---|---|
| JP | 2009-237845 | A | 10/2009 |
| JP | 2012-058968 | A | 3/2012 |

OTHER PUBLICATIONS

Jan. 26, 2017, CN communication issued for related CN application No. 201410108001.8.

\* cited by examiner

DISPLAY CONTROL DEVICE, DISPLAY CONTROL METHOD, AND RECORDING MEDIUM

CROSS REFERENCE TO RELATED APPLICATION

This application is a continuation of U.S. patent application Ser. No. 16/927,665 (filed on Jul. 13, 2020), which is a continuation of U.S. patent application Ser. No. 15/855,377 (filed on Dec. 27, 2017 and issued as U.S. Pat. No. 10,733,807 on Aug. 4, 2020), which is a continuation of U.S. patent application Ser. No. 15/045,246 (filed on Feb. 16, 2016 and issued as U.S. Pat. No. 9,886,798 on Feb. 6, 2018), which is a continuation of U.S. patent application Ser. No. 14/169,474 (filed on Jan. 31, 2014 and issued as U.S. Pat. No. 9,261,954 on Feb. 16, 2016), which claims priority to Japanese Patent Application No. 2013-068395 (filed on Mar. 28, 2013), which are all hereby incorporated by reference in their entirety.

BACKGROUND

The present disclosure relates to a display control device, a display control method, and a recording medium.

A technology called augmented reality (AR) has recently been drawing attention, which shows a user a real space having additional information superimposed thereover. The information shown to the user in the AR technology may be visualized using various forms of virtual objects such as text, icons, or animation. The placement of annotation over an AR space is generally executed on the basis of recognition in three-dimensional structure in the real space shown in an image.

A structure from motion (SfM) technique and a simultaneous localization and mapping (SLAM) technique are known as techniques for recognizing a three-dimensional structure in the real space. In the SfM technique, multiple images are captured from different viewpoints, and, from those images, a three-dimensional structure in the real space shown in the images is recognized using parallax. The SLAM technique is described in Andrew J. Davison, "Real-Time Simultaneous Localization and Mapping with a Single Camera", Proceedings of the 9th IEEE International Conference on Computer Vision Volume 2, 2003, pp. 1403-1410. JP2009-237845A discloses a technique for recognizing three-dimensional positions of feature points, which are selected for initialization in the SLAM technique, by using the SfM technique.

SUMMARY

Once a virtual object is placed in an AR space, the virtual object generally maintains a state that is determined in advance independent of a user's intention. However, there is a case where the user wants to change the state of the virtual object after the placement of the virtual object. For example, there is a case the where the user wants to change the position of the virtual object in the AR space after the placement of the virtual object.

In light of the foregoing, it is desirable in the present disclosure to provide technology capable of changing a position of a virtual object placed in an AR space in accordance with a user's intention.

According to an embodiment of the present disclosure, there is provided a display control device which includes a display controller configured to place a virtual object within an augmented reality space corresponding to a real space in accordance with a recognition result of a real object shown in an image captured by an imaging part, and an operation acquisition part configured to acquire a user operation. When the user operation is a first operation, the display controller causes the virtual object to move within the augmented reality space.

According to another embodiment of the present disclosure, there is provided a display control method which includes placing a virtual object within an augmented reality space corresponding to a real space in accordance with a recognition result of a real object shown in an image captured by an imaging part, acquiring a user operation, and causing the virtual object to move within the augmented reality space when the user operation is a first operation.

According to another embodiment of the present disclosure, there is provided a non-transitory computer-readable recording medium having a program recorded thereon, the program being for causing a computer to function as a display control device including a display controller configured to place a virtual object within an augmented reality space corresponding to a real space in accordance with a recognition result of a real object shown in an image captured by an imaging part, and an operation acquisition part configured to acquire a user operation. When the user operation is a first operation, the display controller causes the virtual object to move within the augmented reality space.

According to one or more of embodiments of the present disclosure, it is possible to change a position of a virtual object placed in an AR space in accordance with a user's intention.

DETAILED DESCRIPTION OF THE EMBODIMENT(S)

Figure 1:
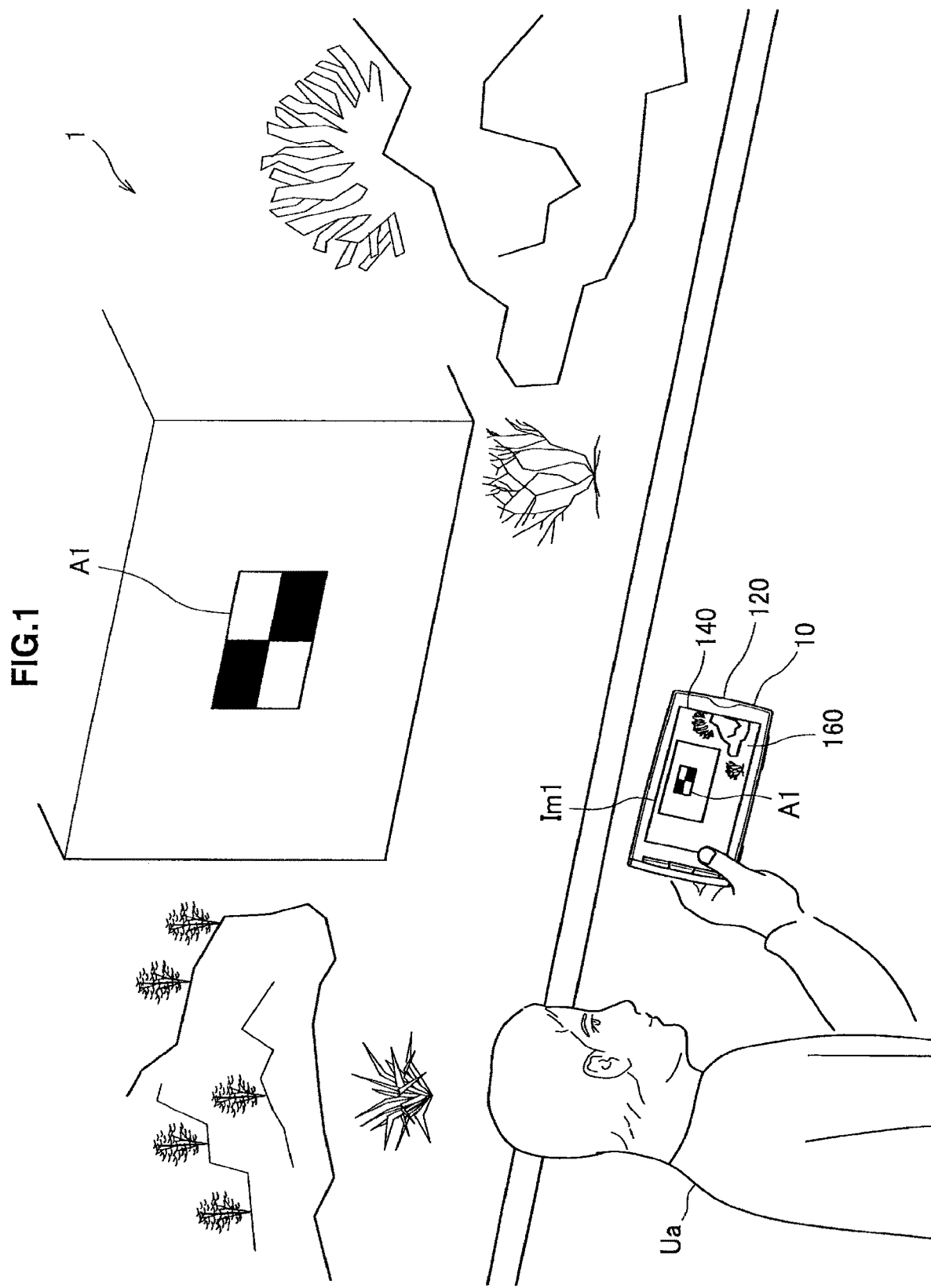
FIG. 1 is a diagram illustrating an overview of a display control device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets or numbers after the same reference numeral. Note that, in the case where it is not necessary to distinguish the multiple structural elements that have substantially the same function and structure from one another, the multiple structural elements are denoted with the same reference numeral only.

Further, the "detailed description of the embodiments" will be described in the following order.

1. Embodiment
1-1. Overview of display control device
1-2. Functional configuration example of display control device
1-3. Initial display of virtual object
1-4. Position/attitude control on virtual object
1-5. Size control on virtual object
1-6. Hardware configuration example
2. Conclusion

1. EMBODIMENT

[1-1. Overview of Display Control Device]

First, an overview of a display control device 10 according to an embodiment of the present disclosure will be described. FIG. 1 is a diagram illustrating an overview of the display control device 10 according to an embodiment of the present disclosure. Referring to FIG. 1, there is shown the display control device 10 held by a user Ua. The display control device 10 includes an imaging part 120, which is directed towards a real space 1, an operation part 140, and a display part 160. The imaging part 120 generates an image by capturing the real space 1.

In the example shown in FIG. 1, the display part 160 displays an image Im1 captured by the imaging part 120. The user Ua is capable of grasping the real space 1 by placing a viewpoint on the image Im1 displayed by the display part 160. However, the image Im1 may not necessarily be displayed on the display part 160. For example, in the case where the display part 160 is a transmissive head mounted display (HMD), the display part 160 does not display the image Im1, and the user Ua may place the viewpoint directly on the real space 1 instead of the image Im1.

Further, a real object A1 is shown in the image Im1. For example, when the real object A1 is recognized from the image Im1, the display control device 10 places a virtual object in an AR space corresponding to the real space 1 on the basis of the recognition result of the real object A1. In this way, the user Ua can view the virtual object placed in the AR space by the display control device 10 via the display part 160. The real object A1 may be recognized by the display control device 10, or may be recognized by a device (for example, server) that is different from the display control device 10.

Here, after the virtual object is placed in the AR space, the virtual object generally maintains a state that is determined in advance independent of the user's intention. However, there is a case where the user Ua wants to change the state of the virtual object after the placement of the virtual object. In light of the foregoing, the present disclosure proposes technology capable of changing a state of a virtual object placed in an AR space in accordance with a user's intention.

Note that, although description below will be made as an example of the case where the display control device 10 is employed as a camera-equipped smartphone, the display control device 10 may also be employed as a device other than a smartphone. For example, the display control device 10 may be employed as a video camera, a digital camera, a personal digital assistant (PDA), a personal computer (PC), a mobile phone, a mobile music playback device, a mobile video processing device, a mobile game console, a telescope, or a binocular.

Heretofore, an overview of a display control device according to an embodiment of the present disclosure has been described.

[1-2. Functional Configuration Example of Display Control Device]

Figure 2:
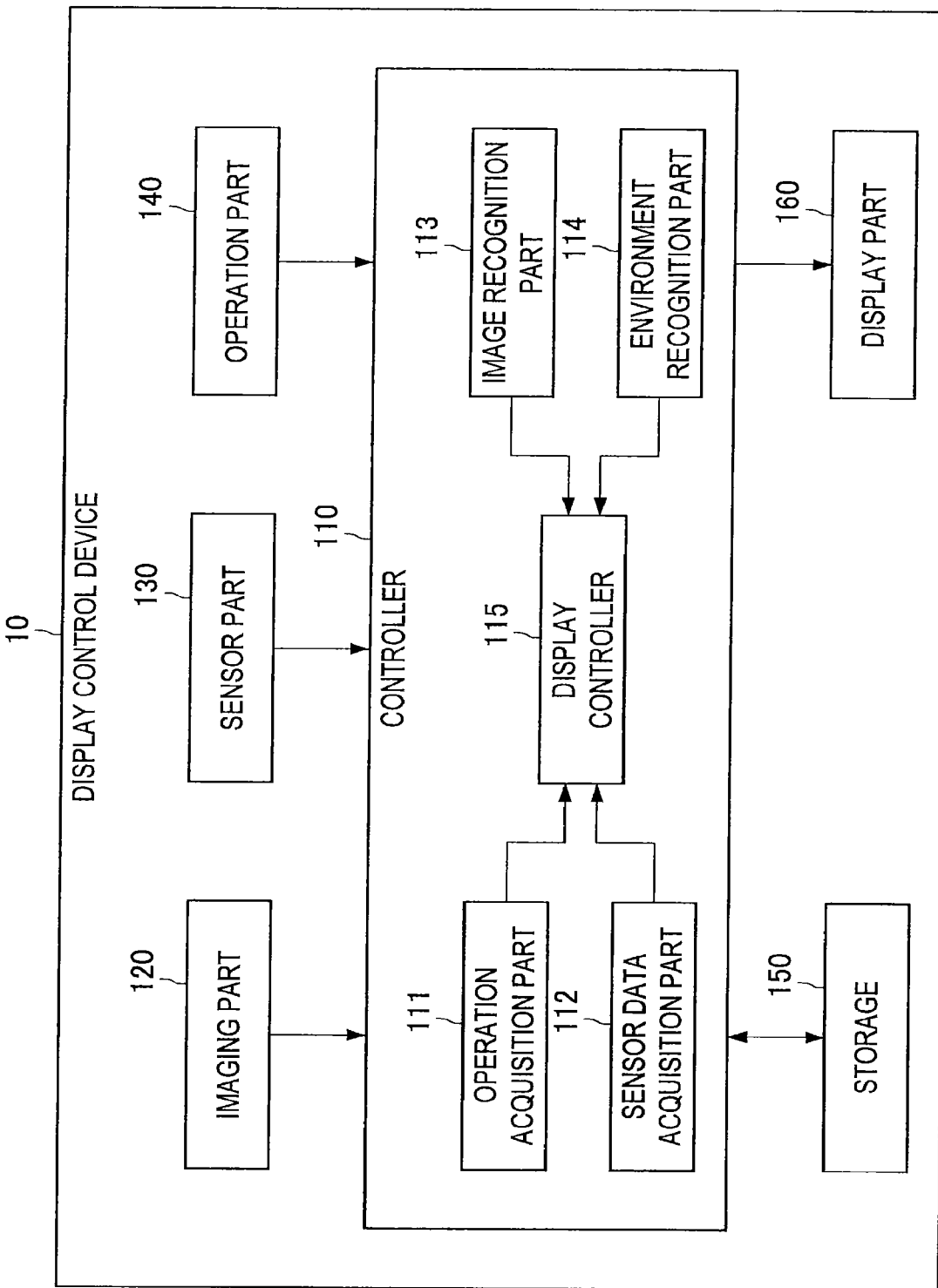
FIG. 2 is a diagram showing a functional configuration example of a display control device according to an embodiment of the present disclosure.

Subsequently, a functional configuration example of the display control device 10 according to an embodiment of the present disclosure will be described. FIG. 2 is a diagram showing a functional configuration example of the display control device 10 according to an embodiment of the present disclosure. As shown in FIG. 2, the display control device 10 includes a controller 110, the imaging part 120, a sensor part 130, the operation part 140, a storage 150, and the display part 160.

The controller 110 corresponds to, for example, a processor such as a central processing unit (CPU) or a digital signal processor (DSP). The controller 110 exhibits various functions that the controller 110 has by executing a program stored in the storage 150 or another storage medium. The controller 110 has functional blocks such as an operation acquisition part 111, a sensor data acquisition part 112, an image recognition part 113, an environment recognition part 114, and a display controller 115. The functions of the respective functional blocks will be described later.

The imaging part 120 is a camera module that captures an image. The imaging part 120 captures a real space using an image sensor such as a charge coupled device (CCD) or a complementary metal oxide semiconductor (CMOS), and generates an image. The image generated by the imaging part 120 is output to the controller 110. Note that, although the imaging part 120 is provided in an integrated manner with the display control device 10 in the example shown in FIG. 2, the imaging part 120 may be provided separately from the display control device 10. For example, an imaging device connected to the display control device 10 via wire or radio may be used as the imaging part 120.

The sensor part 130 acquires sensor data. For example, the sensor part 130 includes a 3-axis acceleration sensor. The 3-axis acceleration sensor measures gravitational acceleration applied to the imaging part 120, and generates sensor data (acceleration data) that shows the size and the direction of the gravitational acceleration in three dimensions. Additionally, the sensor part 130 may include a geomagnetic sensor. The geomagnetic sensor generates sensor data (geomagnetic data) showing the direction of geomagnetism of the imaging part 120 in a coordinate system. Further, the sensor part 130 may also include a positioning sensor (for example, global positioning system (GPS) sensor). The positioning sensor generates sensor data (positioning data) showing the latitude and the longitude of the display control device 10 in the real space. Note that, although the sensor part 130 is provided in an integrated manner with the display control device 10 in the example shown in FIG. 2, the sensor part 130 may be provided separately from the display control device 10.

The operation part 140 detects an operation performed by a user and outputs the operation to the controller 110. In the present specification, since a case is assumed where the operation part 140 is formed of a touch panel, the operation performed by the user corresponds to an operation of tapping the touch panel. However, the operation part 140 may also be formed of hardware other than a touch panel (for example, button). Note that, although the operation part 140 is provided in an integrated manner with the display control device 10 in the example shown in FIG. 2, the operation part 140 may be provided separately from the display control device 10.

The storage 150 uses a recording medium such as semiconductor memory or a hard disk to store a program for causing the controller 110 to operate. Further, for example, the storage 150 can also store various types of data (for example, various types of sensor data and virtual objects) used by the program. Note that, although the storage 150 is provided in an integrated manner with the display control device 10 in the example shown in FIG. 2, the storage 150 may be provided separately from display control device 10.

The display part 160 displays various types of information in accordance with the control performed by the display controller 115. For example, the display part 160 displays an image of an AR application generated by the display control device 10. The display part 160 is formed of, for example, a liquid crystal display (LCD) or an organic electroluminescence (EL) display device. Note that, although the display part 160 is provided in an integrated manner with the display control device 10 in the example shown in FIG. 2, the display part 160 may be provided separately from the display control device 10. For example, a display device connected to the display control device 10 via wire or radio may be used as the display part 160.

Heretofore, a functional configuration example of the display control device 10 according to an embodiment of the present disclosure has been described.

From the next section onwards, the description of the functions that the display control device 10 according to an embodiment of the present disclosure has will be continued in the following order: "Initial display of virtual object"; "Position/attitude control on virtual object"; and "Size control on virtual object". Note that all the functions described in the respective sections of "Initial display of virtual object", "Position/attitude control on virtual object", and "Size control on virtual object" may be used in combination, or only some of the functions may be used in combination.

[1-3. Initial Display of Virtual Object]

Figure 3:
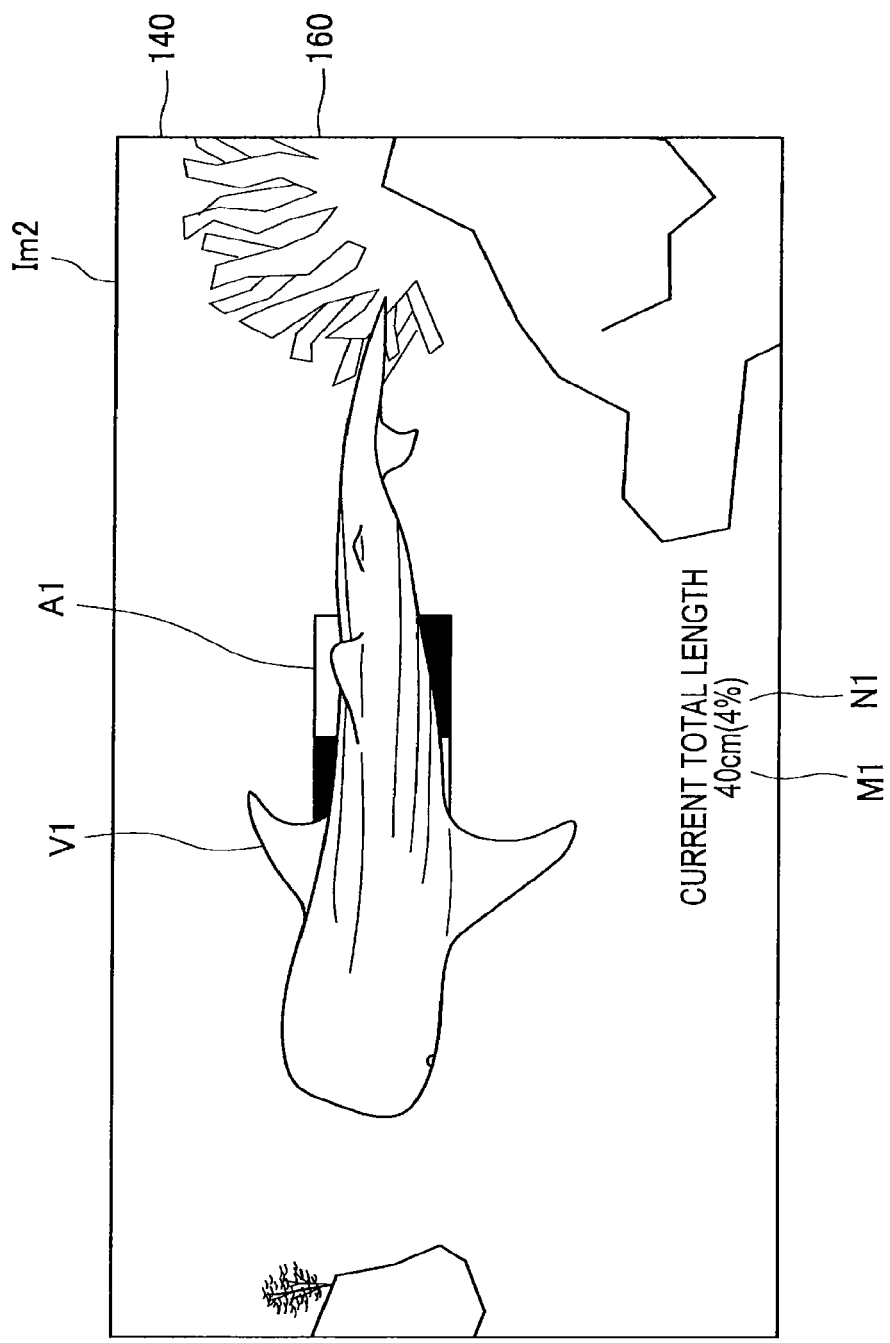
FIG. 3 is a diagram showing an initial display example of a virtual object in a case where a gravity vector is not taken into account.

First, an initial display of a virtual object will be described. Referring to FIG. 3, in an image Im2 captured by the imaging part 120, there is shown a real object A1. Further, the real object A1 is recognized by the image recognition part 113, and a virtual object V1 associated with the recognition result is placed in an AR space corresponding to the real space by the display controller 115. Accordingly, the display part 160 displays the virtual object V1 placed in the AR space.

In more detail, when the image recognition part 113 recognizes the position and the attitude of the real object A1, the display controller 115 identifies the position of the virtual object V1 in accordance with the position of the real object A1, also identifies the attitude of the virtual object V1 in accordance with the attitude of the real object A1, and places the virtual object V1 in accordance with the identified position and attitude. The relationship between the position of the real object A1 and the position of the virtual object V1 may be determined in advance. Further, the relationship between the attitude of the real object A1 and the attitude of the virtual object V1 may also be determined in advance.

For example, the image recognition part 113 checks a partial image included in the image Im2 against patches of respective feature points included in feature data, and detects feature points included in the image Im2. In the case where the feature points belonging to the real object A1 are detected in high density in a region within the image Im2, the image recognition part 113 may recognize that the real object A1 is shown in the region. The image recognition part 113 may further recognize the position and the attitude of the recognized real object A1 on the basis of positional relationship between the detected feature points and three-dimensional shape data.

In the example shown in FIG. 3, when the user Ua visits an aquarium, there is the real object A1 at the back wall surface of a water tank. When the user Ua holds the imaging part 120 over the real object A1 and the image recognition part 113 recognizes the real object A1, a shark serving as an example of the virtual object V1 associated with the recognition result is placed in the AR space corresponding to the real space by the display controller 115. However, the virtual object V1 may be any virtual object other than the shark.

Further, in the example shown in FIG. 3, the display controller 115 causes the size of the virtual object V1 in the AR space to be displayed as a size M1. The size of the virtual object V1 in the AR space may be determined by a technique to be described later. Further, the display controller 115 causes the ratio of the current size of the virtual object V1 in the AR space to the real size of the virtual object V1 to be displayed as a ratio N1. For example, the real size of the virtual object V1 may also be registered in advance. Note that the real size of the virtual object means the size of the real object corresponding to the virtual object. In the case where a shark is assumed as the virtual object, the real size of the virtual object means the size of the shark as the real object.

Here, for example, in the case where the attitude of the real object A1 is not normal, it is assumed that the attitude of the virtual object V1 placed in the AR space is not normal. For example, let us assume the case where the relationship between the attitude of the real object A1 and the attitude of the virtual object V1 is determined such that the attitude of the virtual object V1 is rendered normal when the real object A1 is placed on the horizontal plane. In this case, as shown in FIG. 3, it can be expected that the attitude of the virtual object V1 becomes not normal in the case where the real object A1 is present on the wall surface.

Accordingly, this section proposes technology for rendering the initial display of the virtual object V1 normal, independently of whether the attitude of the real object A1 is normal.

Figure 4:
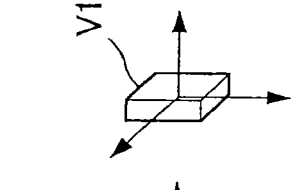
FIG. 4 is a diagram showing comparison results between a case where a gravity vector is not taken into account and a case where a gravity vector is taken into account.

As shown in FIG. 4, let us assume that a real object A0 is placed in a normal attitude. In this case, the attitude of a virtual object V0 placed in the AR space becomes normal in accordance with the position and the attitude of the real object A0. On the other hand, let us assume that a real object A1 is placed in an attitude that is not normal as described above. In this case, the attitude of a virtual object V1 placed in the AR space becomes not normal in accordance with the position and the attitude of the real object A1.

In such a case, for example, the display controller 115 may place a virtual object V2 in a manner that the attitude of the virtual object V2 becomes an attitude corresponding to a gravity vector G. Regarding the gravity vector G, when the sensor part 130 detects acceleration data, the acceleration data may be acquired as the gravity vector G by the sensor data acquisition part 112. For example, if a relationship that is to be satisfied between the direction indicated by the gravity vector G and the attitude of the virtual object V1 is determined in advance, the display controller 115 may rotate the virtual object V1 so as to satisfy the relationship.

Figure 5:
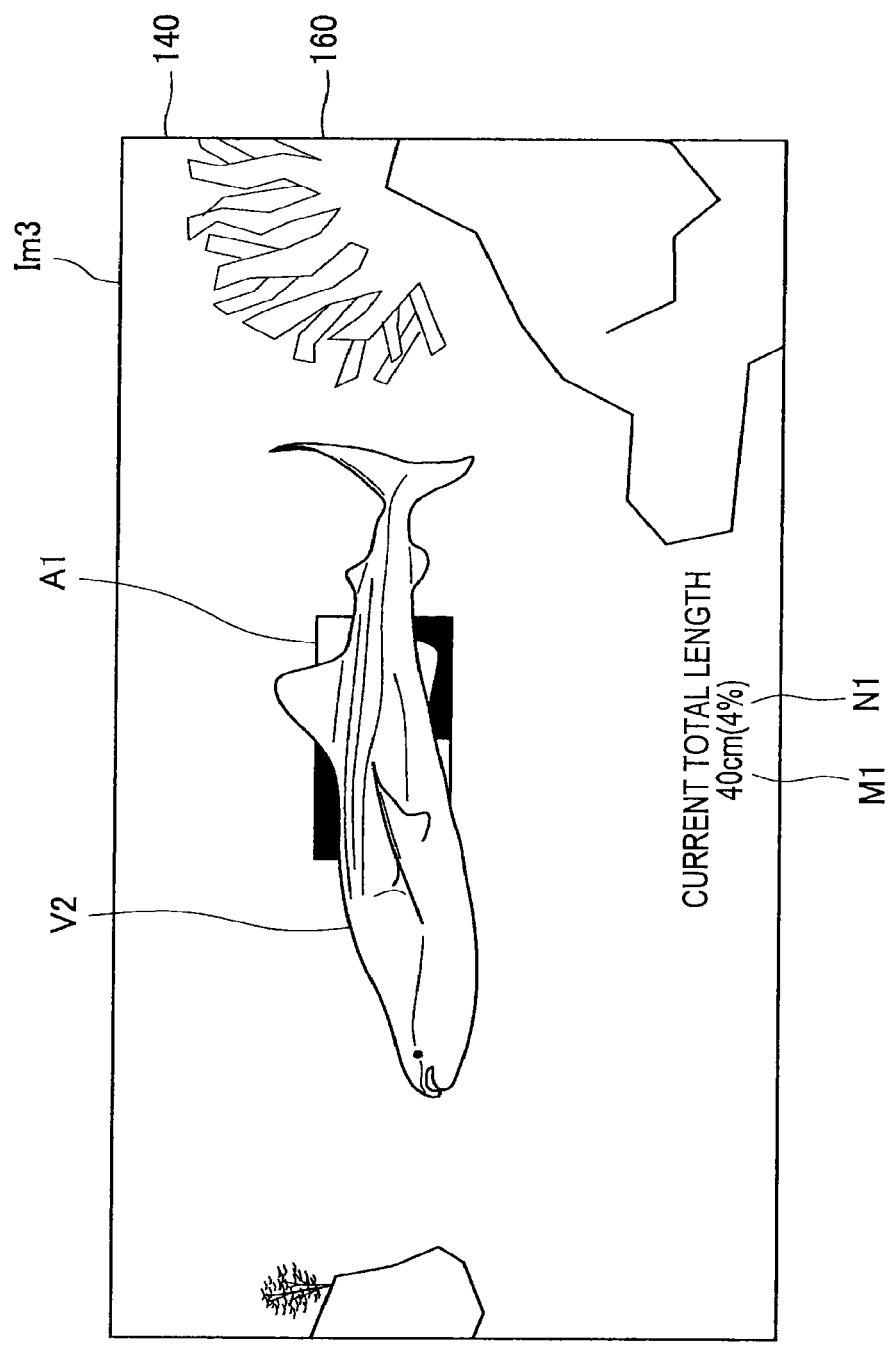
FIG. 5 is a diagram showing an initial display example of a virtual object in a case where a gravity vector is taken into account.

Referring to FIG. 4, there is shown, as the virtual object V2, the result obtained by rotating the virtual object V1 such that the relationship that is to be satisfied between the direction indicated by the gravity vector G and the attitude of the virtual object V1 is satisfied. Further, referring to FIG. 5, an image Im3 is captured, and there is shown, as the virtual object V2, the result obtained by rotating the virtual object V1 such that the relationship is satisfied. In this way, by changing the attitude of the virtual object V1 with the gravity vector G taken into account, it becomes possible to place the virtual object V1 in the AR space such that the virtual object V1 has a normal attitude.

In more detail, the display controller 115 may grasp what attitude the real object A1 is in based on the relationship between the direction indicated by the gravity vector G and the opposite vector of the normal vector of the real object A1, and may determine a degree of rotation of the virtual object V1 in accordance with the attitude of the real object A1.

For example, in the case where the angle between the direction indicated by the gravity vector G and the opposite vector of the normal vector of the real object A1 is more than or equal to 0 degree and less than 45 degrees (or less than or equal to 45 degrees), the display controller 115 may determine that the real object A1 is placed on a floor surface. In such a case, when the virtual object V1 is placed in the normal vector direction of the real object A1, it is not necessary that the display controller 115 rotate the virtual object V1.

Further, for example, in the case where the angle between the direction indicated by the gravity vector G and the opposite vector of the normal vector of the real object A1 is more than or equal to 45 degrees (or more than 45 degrees) and less than 135 degrees, the display controller 115 may determine that the real object A1 is pasted on a wall surface. In such a case, when the virtual object V1 is placed in the normal vector direction of the real object A1, the display controller 115 may rotate the virtual object V1 90 degrees in the direction indicated by the gravity vector G.

Further, for example, in the case where the angle between the direction indicated by the gravity vector G and the opposite vector of the normal vector of the real object A1 is more than or equal to 135 degrees (or more than 135 degrees) and less than or equal to 180 degrees, the display controller 115 may determine that the real object A1 is pasted on a ceiling. In such a case, when the virtual object V1 is placed in the normal vector direction of the real object A1, the display controller 115 may rotate the virtual object V1 180 degrees in the direction indicated by the gravity vector G.

Figure 6:
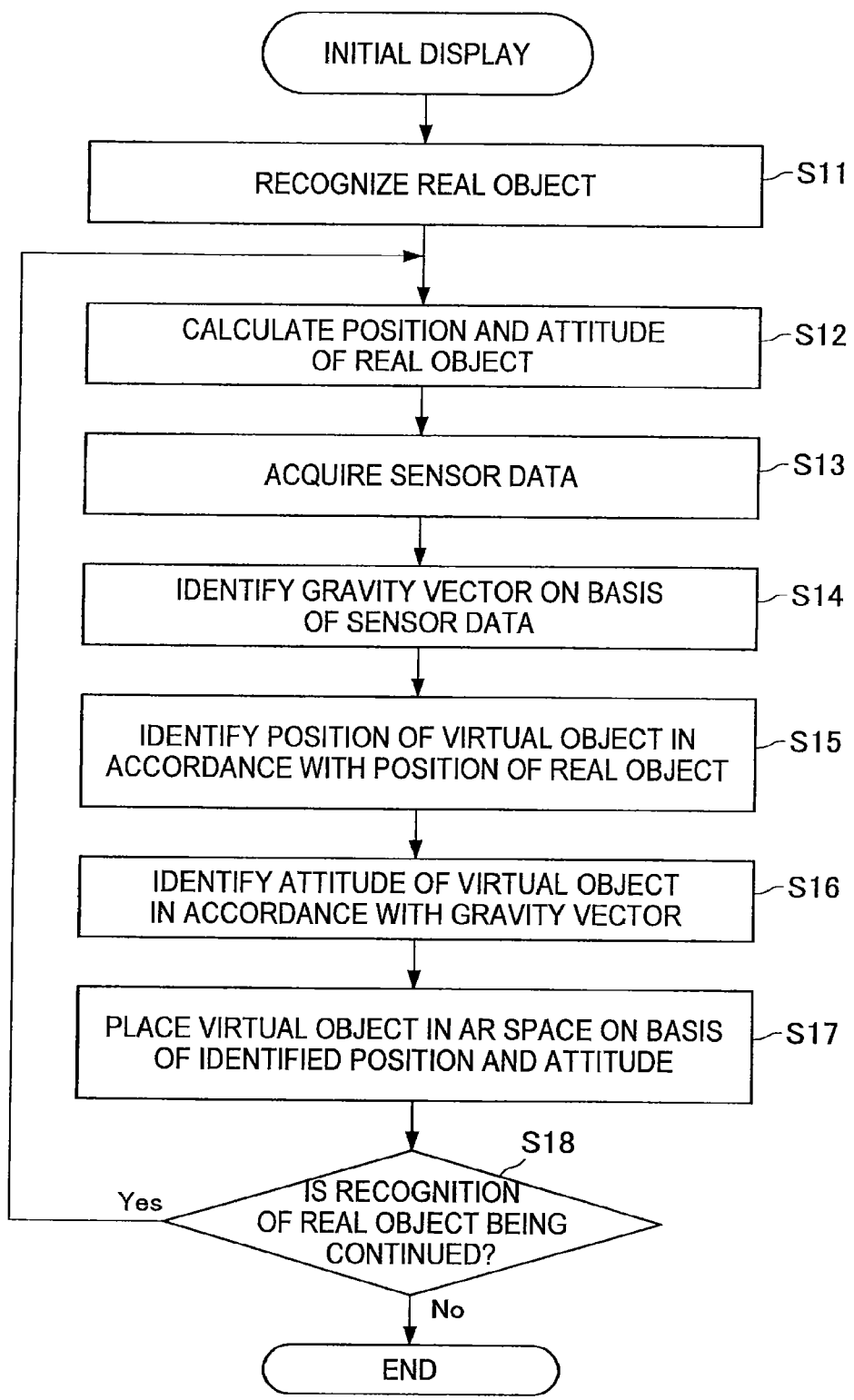
FIG. 6 is a flowchart showing an operation example of an initial display of a virtual object.

FIG. 6 is a flowchart showing an operation example of an initial display of the virtual object V2. First, when the imaging part 120 captures an image, the image recognition part 113 recognizes the real object A1 from the image captured by the imaging part 120 (S11). The image recognition part 113 calculates the position and the attitude of the real object A1 (S12). Further, the sensor data acquisition part 112 acquires sensor data detected by the sensor part 130 (S13), and identifies a gravity vector on the basis of the sensor data (S14). For example, in the case where acceleration data is acquired as the sensor data, the acceleration data may be identified as the gravity vector.

The display controller 115 identifies the position of the virtual object V1 in accordance with the position of the real object A1 (S15). Subsequently, the display controller 115 identifies the attitude of a virtual object in accordance with the gravity vector (S16). The display controller 115 places the virtual object V2 in the AR space on the basis of the identified position and attitude (S17). In the case where the recognition of real object A1 performed by the image recognition part 113 is not continued ("No" in S18), the controller 110 may complete the operation, and in the case where the recognition of the real object A1 performed by the image recognition part 113 is being continued ("Yes" in S18), the processing may return to step S11.

Heretofore, "Initial display of virtual object" has been described.

[1-4. Position/Attitude Control on Virtual Object]

Figure 7:
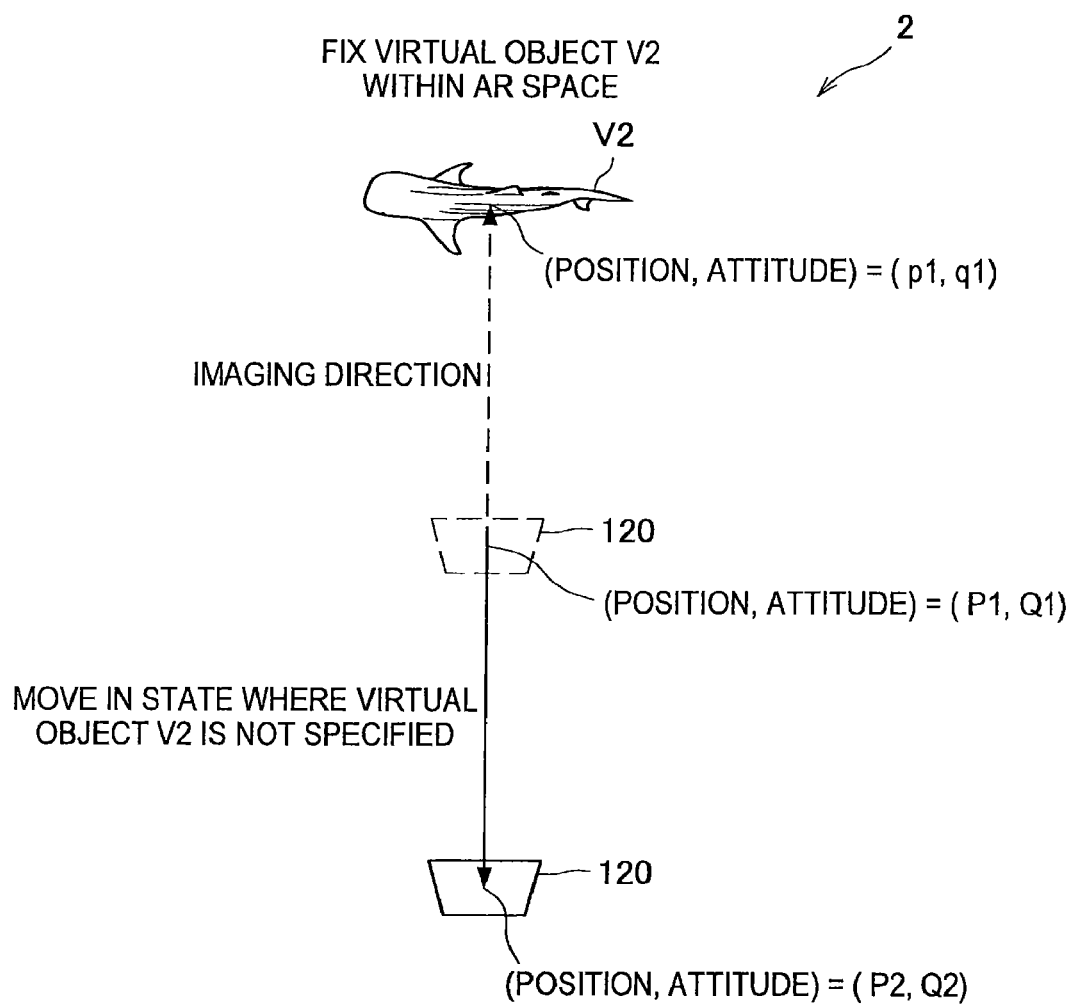
FIG. 7 is a diagram illustrating a case where a virtual object is fixed within an augmented reality space.

Subsequently, position/attitude control on a virtual object will be described. Referring to FIG. 7, the display controller 115 places the virtual object V2 in an AR space 2. Here, as shown in FIG. 7, the position and attitude of the imaging part 120 are represented by P1 and Q1, respectively, and the position and the attitude of the virtual object V2 are represented by p1 and q1, respectively. Let us assume that, in this state, the position and the attitude of the imaging part 120 are changed to P2 and Q2, respectively. In this case, the virtual object V2 is generally fixed within the AR space. However, there is a case where the user Ua wants to change the position of the virtual object V2 in the AR space after the placement of the virtual object V2.

For example, assuming a scene where the user Ua is about to take a photograph of the virtual object V2, there may be a case where the user Ua wants to move the virtual object V2 and decides a background, and then take a photograph of the virtual object V2. Further, for example, in the case where the user Ua does not want to include the real object A1 within an imaging range, a case is assumed where the user Ua wants to take a photograph of the virtual object V2 after moving the virtual object V2 to a position such that the real object A1 is out of the imaging range.

Accordingly, this section proposes technology for making it possible to change the position of the virtual object V2 placed in the AR space in accordance with a user's intention.

First, description will be made of the case where the position of the virtual object V2 placed in the AR space is not changed. For example, the display controller 115 may fix the virtual object V2 within the AR space while there is no first operation being performed. The first operation may be any operation, and may be an operation of specifying the virtual object V2. Hereinafter, description will be made as an example of the case where the operation of specifying the virtual object V2 is used as the first operation. The operation of specifying the virtual object V2 may include, for example, an operation of specifying the virtual object V2 using one or more operating objects.

The operation of specifying the virtual object V2 may be an operation of tapping the virtual object V2. Further, the operation of specifying the virtual object V2 may be, in the case where the display part 160 is a transmissive HMD, an operation of holding the virtual object V2 between two operating objects (for example, two fingers). Alternatively, the operation of specifying the virtual object V2 may be a gesture of turning a line of sight to the virtual object V2. For example, the operation of specifying the virtual object V2 may be performed during the time period from the start to the release of specifying the virtual object V2.

As shown in FIG. 7, let us assume that the position and the attitude of the imaging part 120 are changed to P2 and Q2, respectively, under the state where the virtual object V2 is not specified. Under the state where the virtual object V2 is not specified, the display controller 115 may fix the virtual object V2 within the AR space. For example, under the state where the virtual object V2 is not specified, the display controller 115 may cause the size of the virtual object V2 in the image to be changed in accordance with the distance between the imaging part 120 and the virtual object V2.

Figure 8:
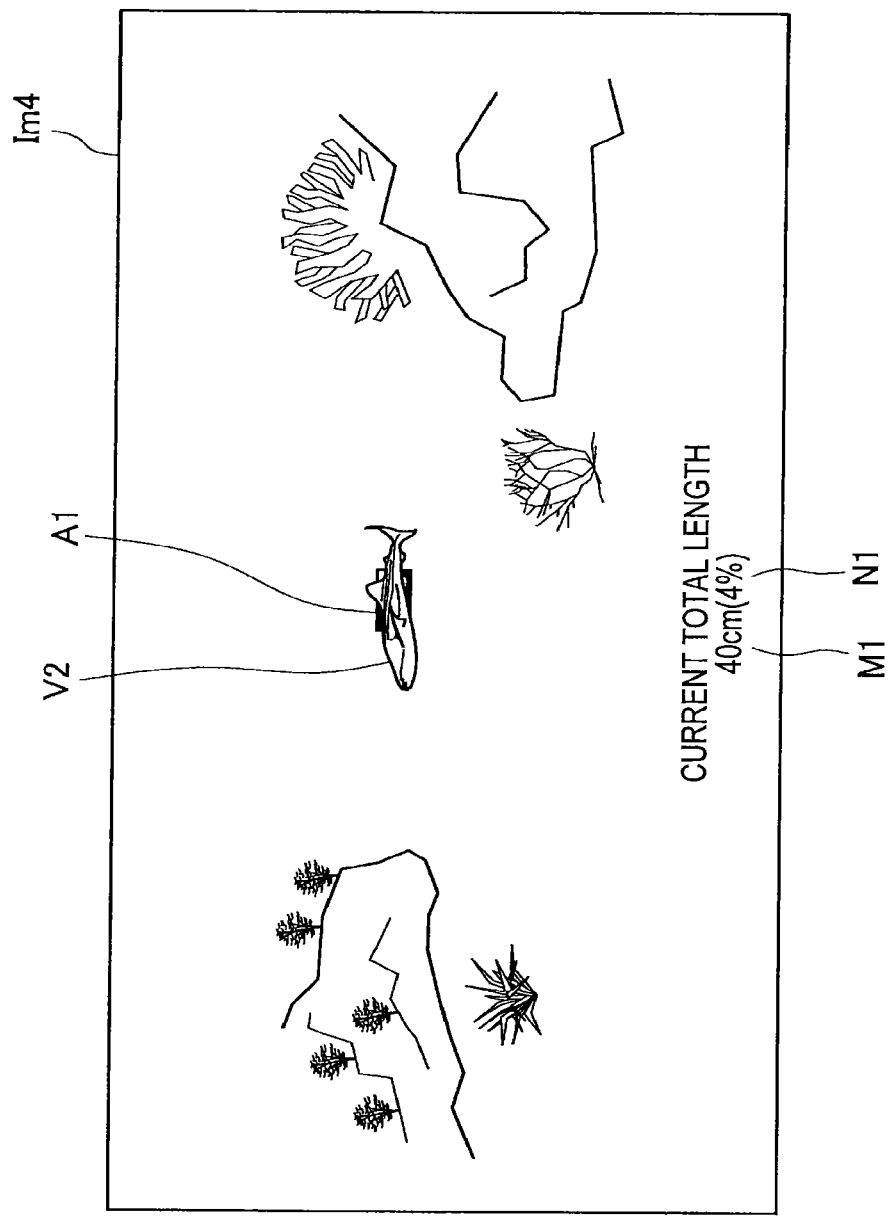
FIG. 8 is a diagram showing a display example of a case where a virtual object is fixed within an augmented reality space.

For example, referring to FIG. 8, an image Im4 is captured. As shown in FIG. 8, under the state where the virtual object V2 is not specified, the display controller 115 may make the size of the virtual object V2 in the image Im4 to decrease, as the user Ua moves away from the virtual object V2 and the distance between the imaging part 120 and the virtual object V2 increases.

Further, under the state where the virtual object V2 is not specified, the display controller 115 may cause the attitude of the virtual object V2 in the image to be changed in accordance with the attitude of the virtual object V2 based on the imaging part 120. For example, under the state where the virtual object V2 is not specified, in the case where the user Ua changes an imaging direction and the attitude of the virtual object V2 based on the imaging part 120 has changed, the display controller 115 may cause the attitude of the virtual object V2 in the image to be changed in accordance with the changed attitude.

On the other hand, in the case where a user operation acquired by the operation acquisition part 111 is an operation of specifying the virtual object V2, the display controller 115 may cause the virtual object V2 to move within the AR space. While the display controller 115 causes the virtual object V2 to move within the AR space, the display controller 115 may control any output. For example, while the display controller 115 causes the virtual object V2 to move within the AR space, the display controller 115 may cause the fact that the virtual object V2 is being moved to be displayed.

Figure 9:
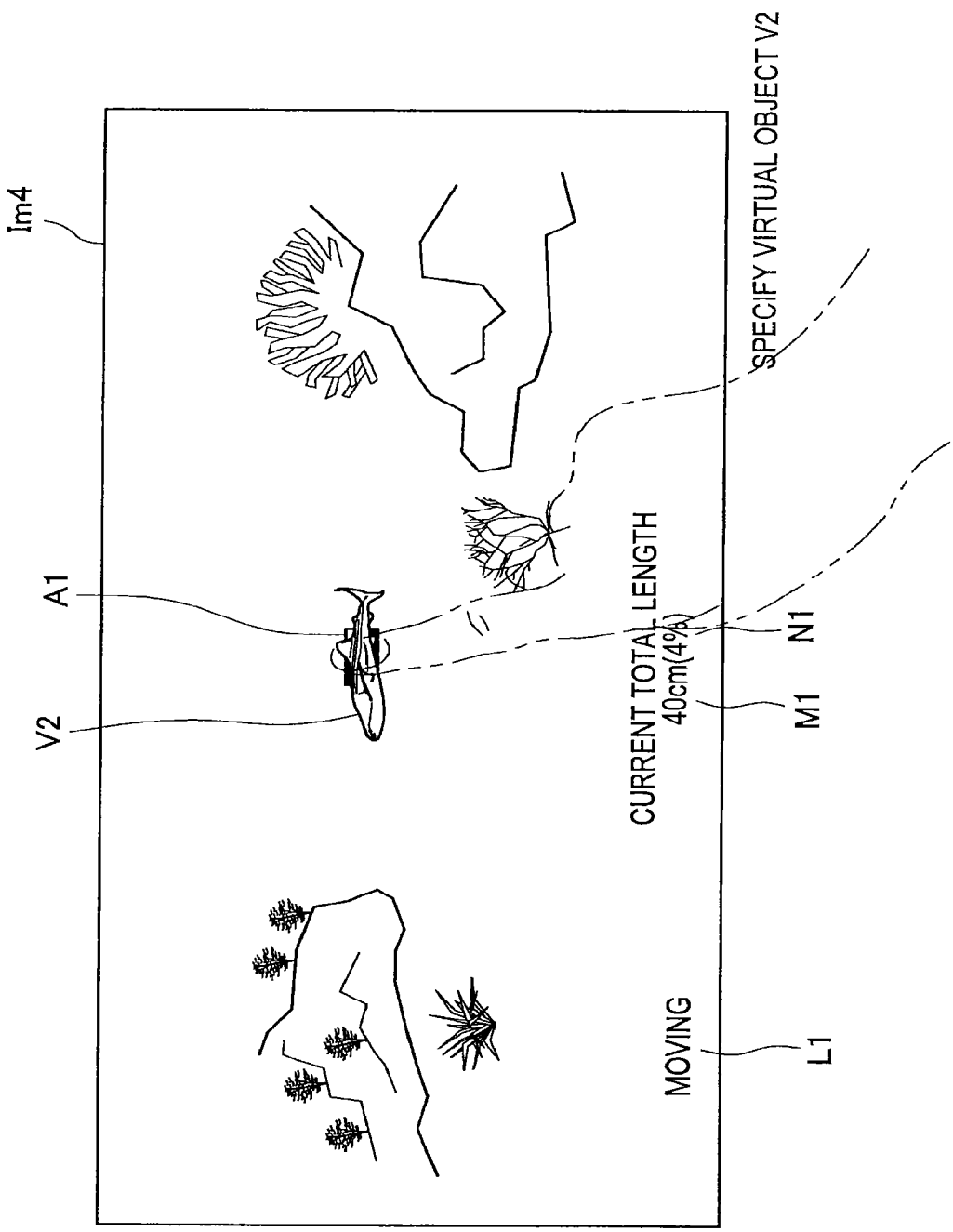
FIG. 9 is a diagram showing a display example of before movement of a virtual object in a case where the virtual object is to be moved within an augmented reality space.

For example, as shown in FIG. 9, the display controller 115 may cause a message L1 to be displayed, the message L1 showing that the virtual object V2 is "moving". However, the fact that the virtual object V2 is being moved may be shown without using a message. For example, the display controller 115 may cause the fact that the virtual object V2 is being moved to be displayed by allowing the virtual object V2 to have a motion.

In what way to move the virtual object V2 is not limited. As an example, as shown in FIG. 10, under the state where the virtual object V2 is specified, in the case where the position of the imaging part 120 is changed from P2 to P3 and the attitude of the imaging part 120 is changed from Q2 to Q3, the display controller 115 may cause the virtual object V2 to move within the AR space under the state where the relative position relationship between the imaging part 120 and the virtual object V2 is maintained.

In the case where the virtual object V2 is moved within the AR space in this way, the virtual object V2 may be fixed in the imaging range. Accordingly, the display controller 115 may cause some kind of virtual object (for example, a stick that pierces the virtual object V2) indicating that virtual object V2 is fixed to the imaging range to be displayed. In the example shown in FIG. 10, the position of the virtual object V2 is moved from p1 to p2, and the attitude of the virtual object V2 is changed from q1 to q2.

Further, the display controller 115 may grasp the position and the attitude of the imaging part 120 in any technique. For example, the display controller 115 may grasp the position and the attitude of the imaging part 120 on the basis of a result of environment recognition performed by the environment recognition part 114. As the environment recognition performed by the environment recognition part 114, calculation based on the SLAM technique can be used. According to the calculation based on the SLAM technique, a three-dimensional structure of a real space shown in an image captured by the imaging part 120 and a position and an attitude of the imaging part 120 can be recognized dynamically.

Figure 10:
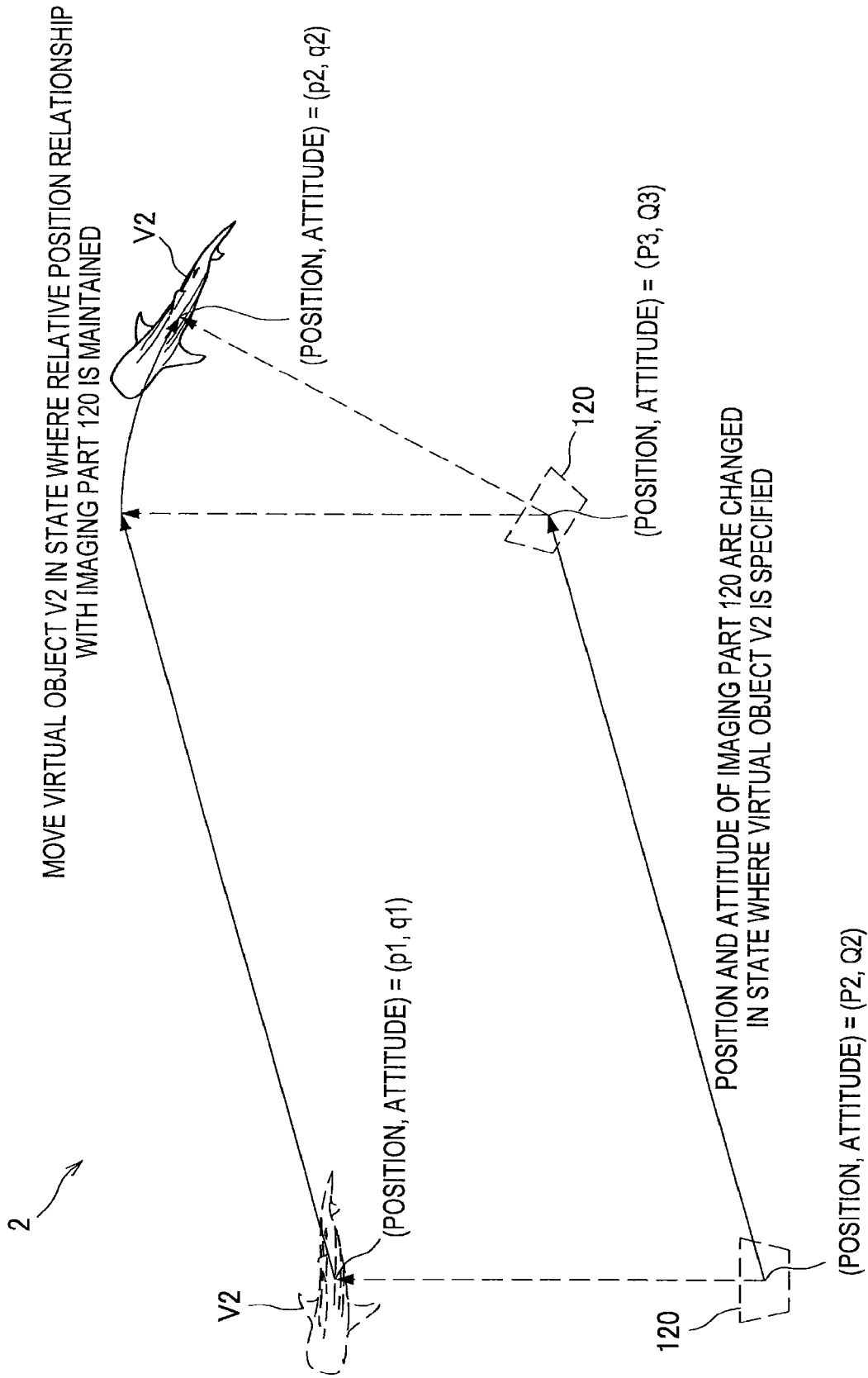
FIG. 10 is a diagram illustrating a case where a virtual object is moved within an augmented reality space.

Note that FIG. 10 shows an example in which the display controller 115 causes one virtual object V2 specified by an operation for specifying the virtual object V2 to move within the AR space, but the number of virtual objects to be moved may not be one. In the case where a user operation acquired by the operation acquisition part 111 is an operation for specifying a virtual object, the display controller 115 may cause one or multiple virtual objects specified by the operation for specifying a virtual object to move within the AR space.

According to such a configuration, the user Ua can cause the virtual object V2 to move by changing the position and the attitude of the imaging part 120 during the time period from the start to the release of the operation of specifying the virtual object V2. Accordingly, a sense as if the virtual object V2 is moved using a drag and drop operation can be given to the user Ua, and the user Ua can intuitively move the virtual object V2 within the AR space.

Figure 11:
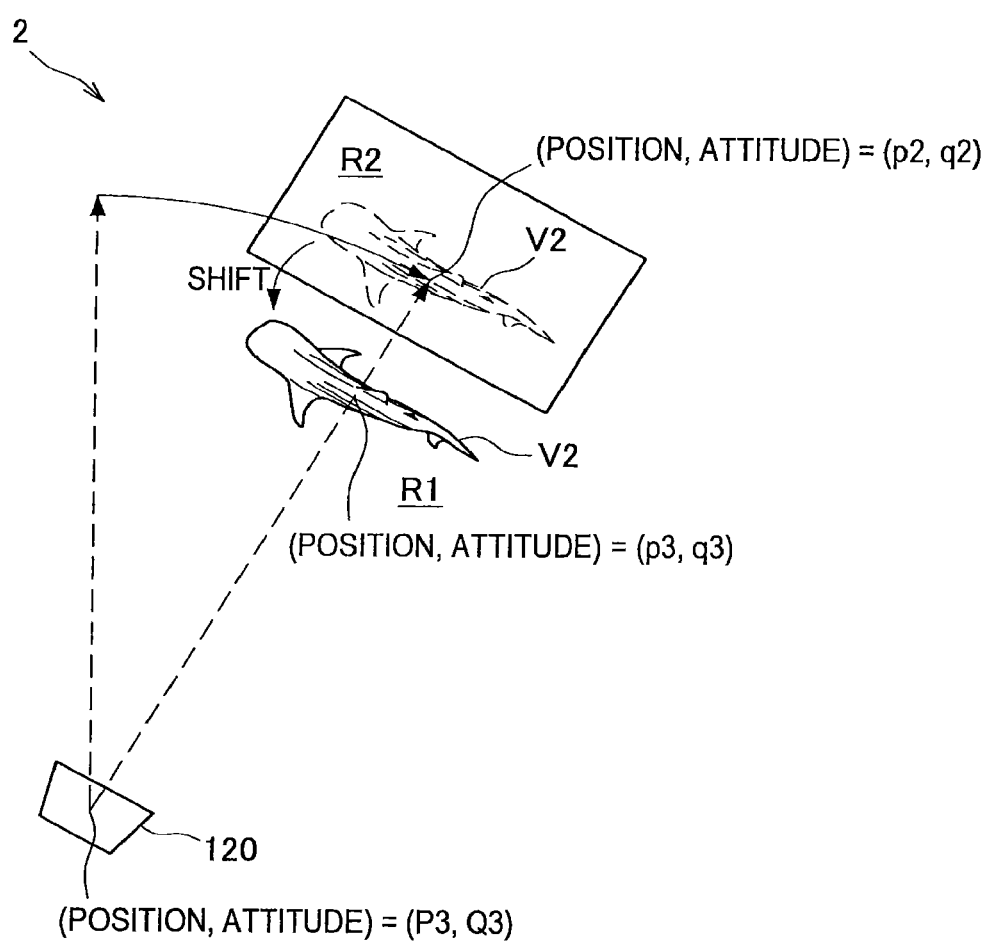
FIG. 11 is a diagram illustrating a case where a position of a virtual object is shifted to a movement-capable region.

Here, it is expected that an environment of the virtual object V2 at a destination may be any of various environments. Accordingly, the display controller 115 may control the virtual object V2 on the basis of the environment of the virtual object V2 at the destination. For example, as shown in FIG. 11, in the case where the environment of the virtual object V2 at the destination is a movement-incapable region R2, the display controller 115 may cause the position of the virtual object V2 to be shifted to a movement-capable region R1. The movement-incapable region R2 may be a region in which it is not possible for a real object to enter from outside, such as a pillar and a wall.

Alternatively, the display controller 115 may cause the virtual object V2 to perform a motion associated with the environment of the virtual object V2 at the destination. For example, in the case where the environment of the virtual object V2 at the destination is the sea, the display controller 115 may express the virtual object V2 in an animation in which the virtual object V2 starts swimming. Further, for example, in the case where the environment of the virtual object V2 at the destination is the land, the display controller 115 may express the virtual object V2 in an animation in which the virtual object V2 stops swimming.

Figure 12:
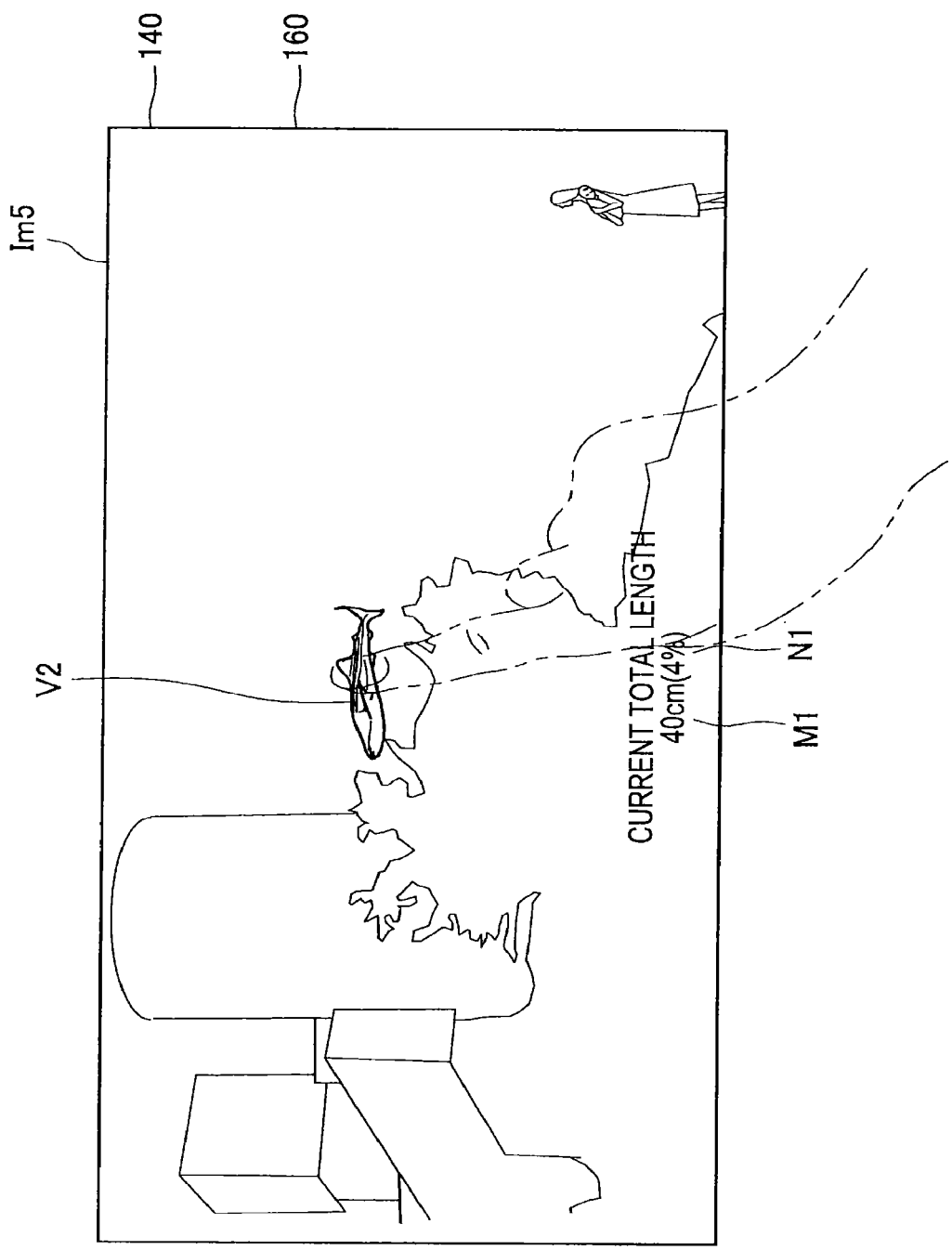
FIG. 12 is a diagram showing a display example of after movement of a virtual object in a case where the virtual object is moved within an augmented reality space.

FIG. 12 is a diagram showing a display example of after movement of the virtual object V2 in a case where the virtual object V2 is to be moved within the AR space. Referring to FIG. 12, an image Im5 is captured, and the virtual object V2 is being moved. In this way, the position of the virtual object V2 placed in the AR space can be changed in accordance with a user's intention. In the example shown in FIG. 12, an aquarium is used as the background, and the family of the user Ua and the virtual object V2 can be fit into a single imaging range.

Figure 13:
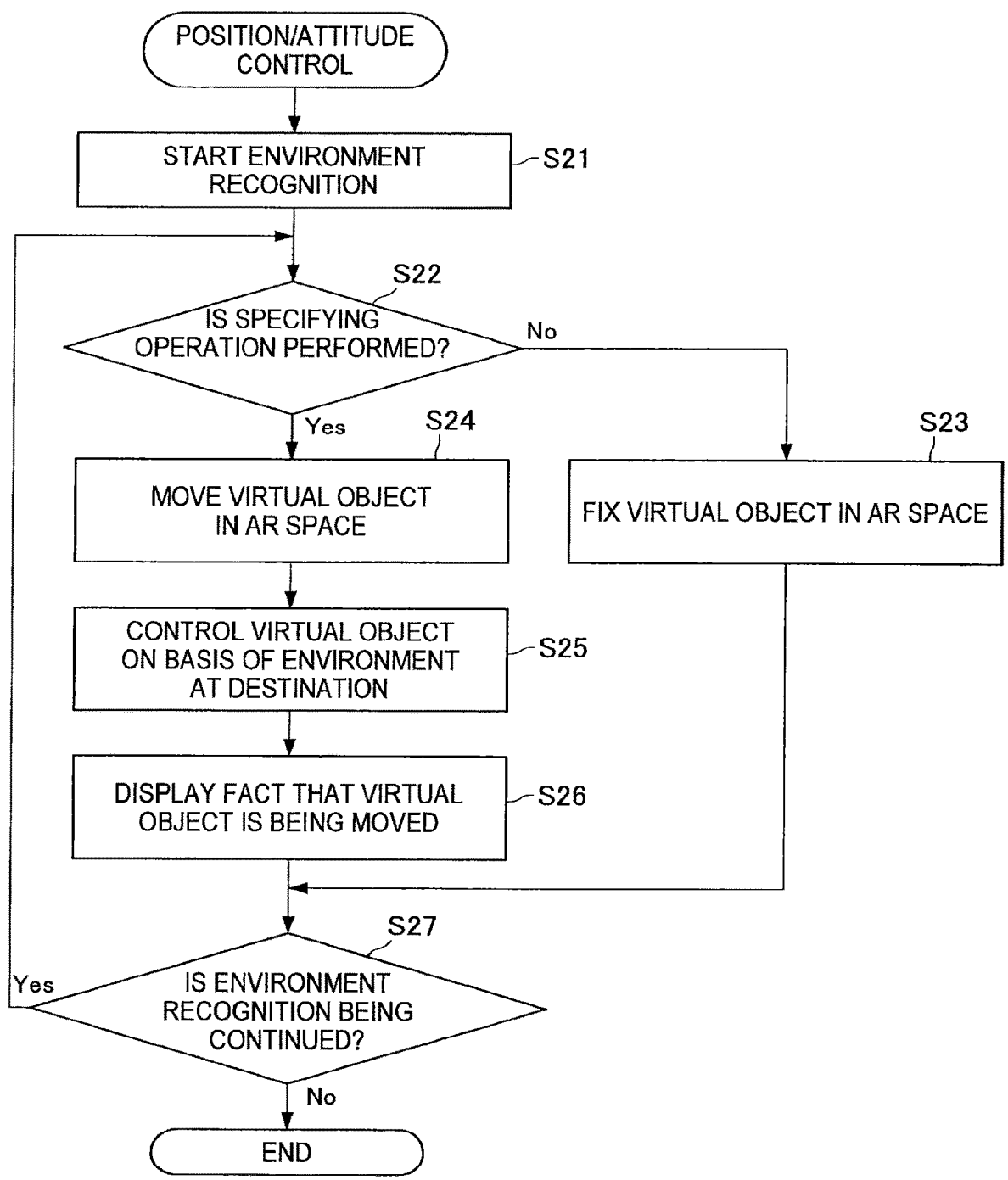
FIG. 13 is a flowchart showing an operation example of controlling a position/attitude of a virtual object.

FIG. 13 is a flowchart showing an operation example of controlling a position/attitude of the virtual object V2. First, the environment recognition part 114 starts environment recognition (S21), and the operation acquisition part 111 acquires a user operation. In the case where an operation for specifying the virtual object V2 is not performed ("No" in S22), the display controller 115 fixes the virtual object V2 in the AR space (S23), and the controller 110 proceeds to S27.

On the other hand, in the case where an operation for specifying the virtual object V2 is performed ("Yes" in S22), the display controller 115 causes the virtual object V2 to move in the AR space (S24), and controls the virtual object V2 on the basis of an environment at a destination (S25). In addition, the display controller 115 causes the fact that the virtual object V2 is being moved to be displayed (S26), and the controller 110 proceeds to S27. In the case where environment recognition performed by the environment recognition part 114 is not continued ("No" in S27), the controller 110 may complete the operation, and in the case where the environment recognition performed by the environment recognition part 114 is being continued ("Yes" in S27), the processing may return to step S22.

Heretofore, "Position/attitude control on virtual object" has been described.

[1-5. Size Control on Virtual Object]

Figure 14:
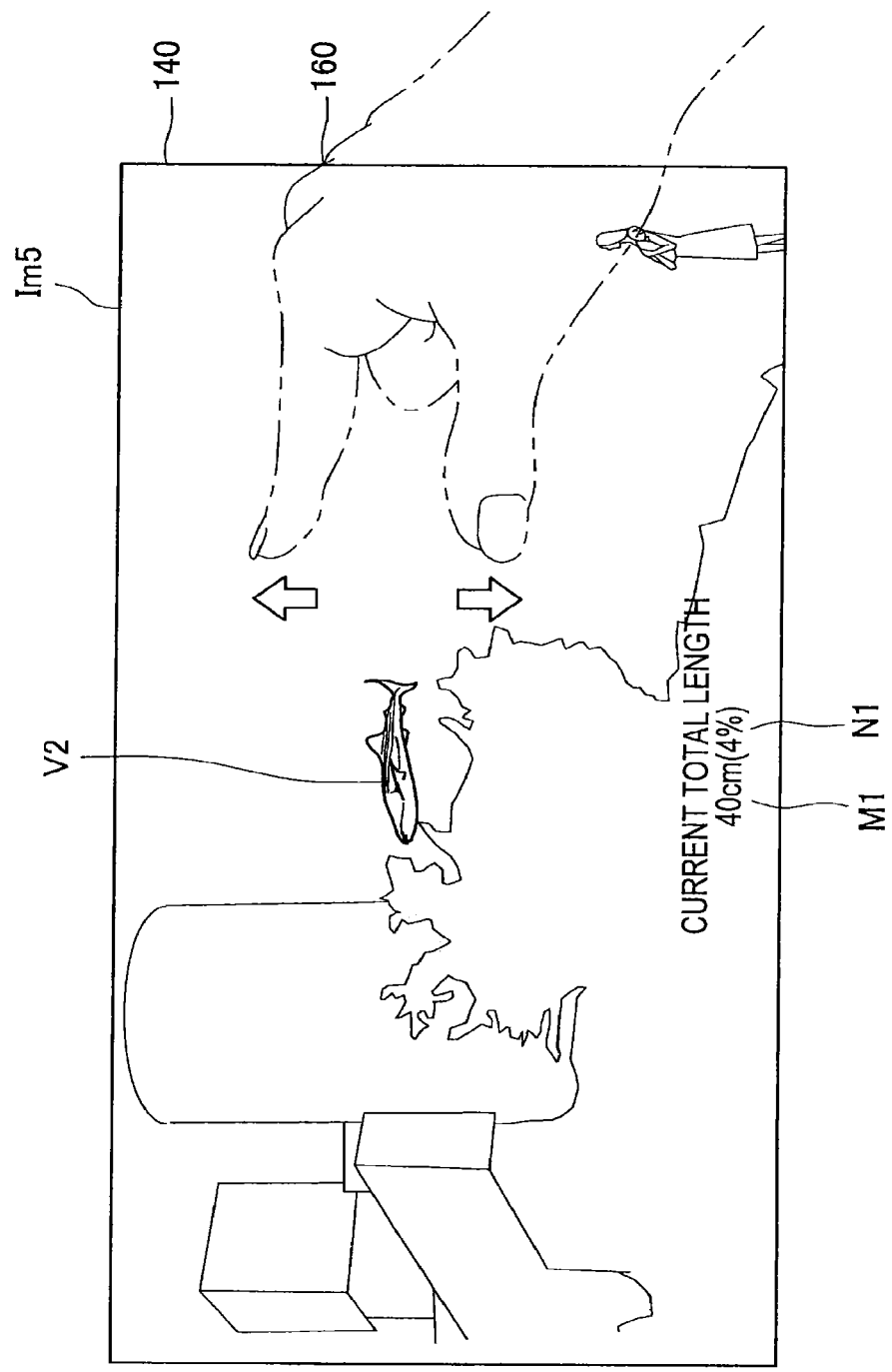
FIG. 14 is a diagram showing a display example of before enlargement of a virtual object in a case where the virtual object is to be enlarged within an augmented reality space.

Subsequently, size control on a virtual object will be described. Referring to FIG. 14, the display controller 115 places the virtual object V2 in an AR space 2. Here, the size of the virtual object V2 in an image is generally decided in accordance with the size of the real object A1 in the image. However, there is a case where the user Ua wants to change the size of the virtual object V2 in the AR space after the placement of the virtual object V2.

For example, assuming a scene where the user Ua is about to take a photograph of the virtual object V2, there may be a case where the user Ua wants to increase the size of the virtual object V2 in the AR space up to the real size, and then take a photograph of the virtual object V2. Accordingly, this section proposes technology for making it possible to change the size in the AR space of the virtual object V2 placed in the AR space in accordance with a user's intention.

Specifically, in the case where a user operation is a second operation, the display controller 115 may change the size of the virtual object V2 in the AR space on the basis of the second operation. The second operation may be any operation, and may include, as shown in FIG. 14 for example, an operation of changing a distance between multiple operating objects. For example, in the case where the user operation is an operation of making the distance between multiple operating objects smaller (for example, pinch-close operation), the size of the virtual object V2 in the AR space may be reduced.

Figure 15:
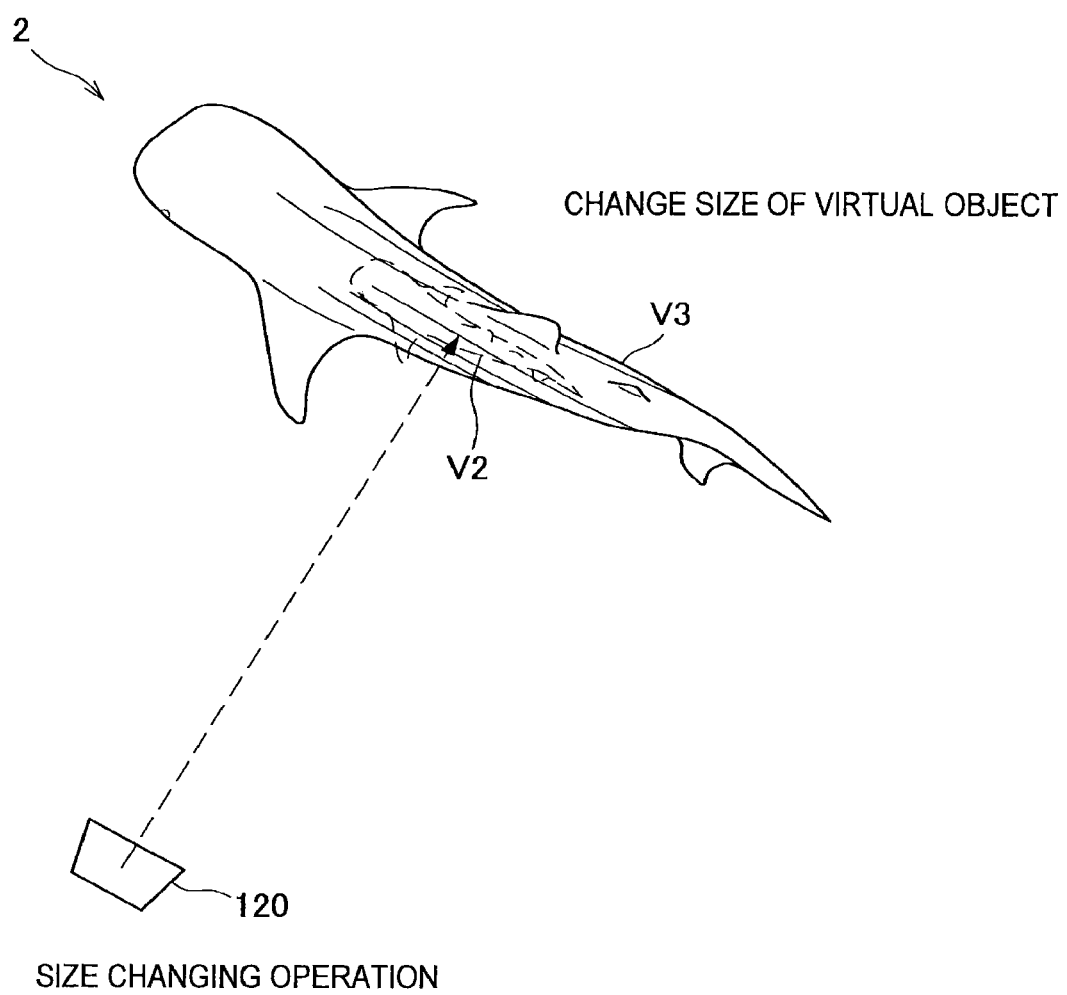
FIG. 15 is a diagram illustrating a case of enlarging a virtual object within an augmented reality space.

Further, for example, in the case where the user operation is an operation of making the distance between multiple operating objects larger (for example, pinch-open operation), the size of the virtual object V2 in the AR space may be increased. Referring to FIG. 15, as a result of increasing the size of the virtual object in the AR space, there is shown a state where the virtual object placed in the AR space is changed from the virtual object V2 to a virtual object V3.

Figure 16:
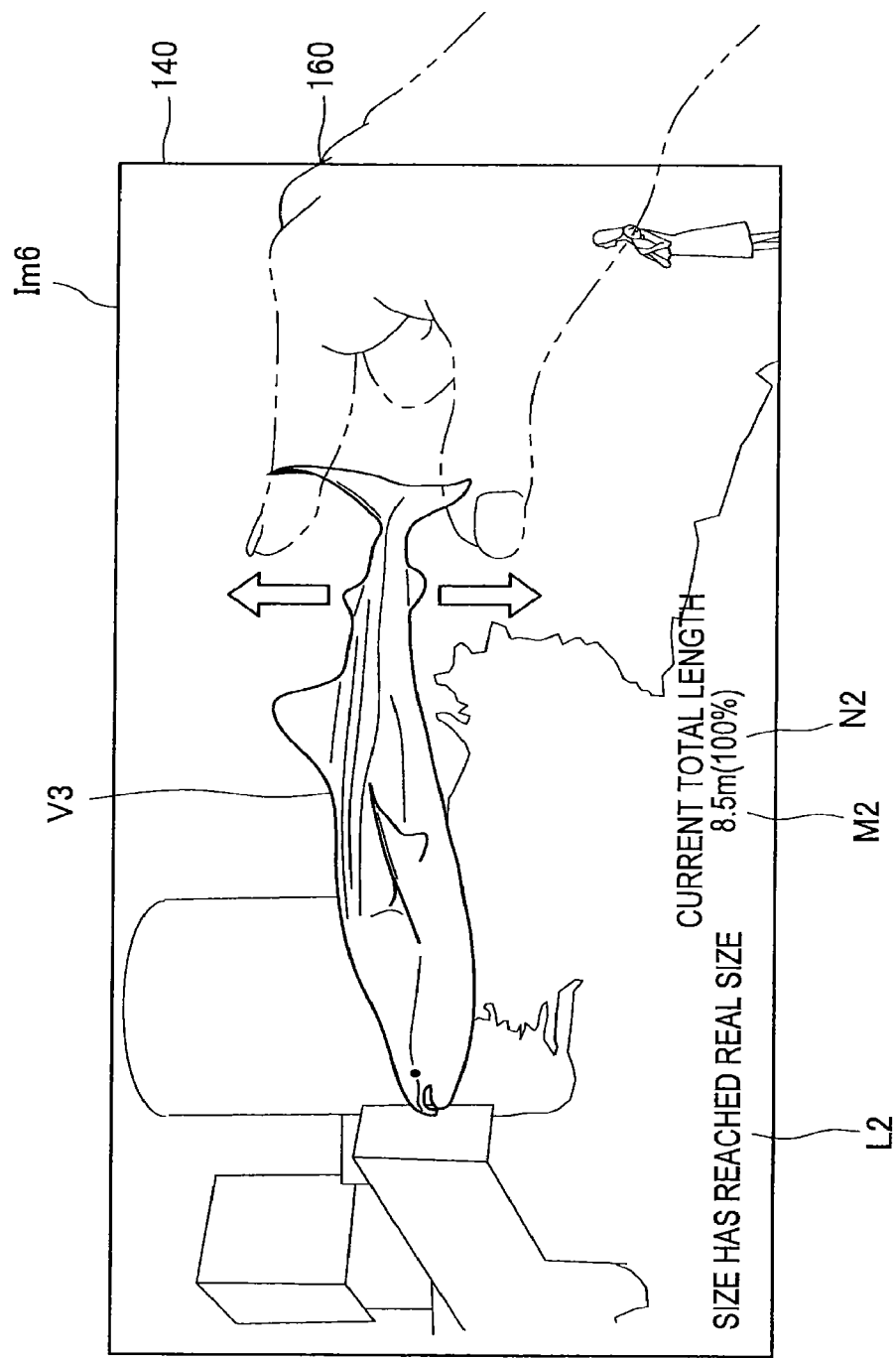
FIG. 16 is a diagram showing a display example of after enlargement of a virtual object in a case where the virtual object is to be enlarged within an augmented reality space.

FIG. 16 is a diagram showing a display example of after enlargement of a virtual object in a case where the virtual object is to be enlarged within an augmented reality space. As shown in FIG. 16, in the case where it is possible to enlarge the virtual object V3, a limit on enlargement may be set for the virtual object V3. (Alternatively, in the case where it is possible to reduce the virtual object V3, a limit on reduction may be set for the virtual object V3.) For example, FIG. 16 shows an image Im6, and as shown in FIG. 16, the display controller 115 may stop enlarging the virtual object when the size of the virtual object in the AR space has reached the real size of the virtual object.

Further, in the case where the size of the virtual object in the AR space has reached the real size of the virtual object, the display controller 115 may cause the fact that the size of the virtual object in the AR space has reached the real size of the virtual object to be displayed. For example, as shown in FIG. 16, the display controller 115 may cause a message L2 to be displayed, which shows that the size of the virtual object in the AR space has reached the real size.

Further, in the example shown in FIG. 16, the display controller 115 causes a size M2 to be displayed, the size M2 being the size of the virtual object V3 displayed in the AR space. Further, the display controller 115 causes a ratio N2 to be displayed, the ratio N2 being the ratio of the current size of the virtual object V3 in the AR space to the real size of the virtual object V3.

Here, a technique of determining whether the size of the virtual object in the AR space has reached the real size of the virtual object is not particularly limited. As an example, the display controller 115 may determine whether the size of the virtual object in the AR space has reached the real size of the virtual object on the basis of known data related to the real size of the real object A1, the size of the real object A1 in the image, and known data related to the real size of the virtual object.

More specifically, in the case where the real size of the real object A1 is registered as the known data, the display controller 115 may calculate the ratio of the real size of the real object A1 to the size of the real object A1 in the image. In this way, when the real object A1 and the virtual object are placed at the same distance from the imaging part 120, the display controller 115 can calculate the size of the virtual object in the AR space by multiplying the size of the virtual object in the image by the calculated ratio.

Note that, even when the distance between the real object A1 and the imaging part 120 is different from the distance between the virtual object and the imaging part 120, the size of the virtual object in the AR space can be calculated. For example, with the use of the ratio of the real size of the real object A1 to the size of the real object A1 in the image, the position of the real object A1 in the real space based on the position of the imaging part 120 can be grasped. Further, even if the user Ua moves the imaging part 120 to a position at which the virtual object is included in the imaging range, the display controller 115 can grasp, on the basis of a result of environment recognition, the position of the real object A1 in the real space and the position of the virtual object in the AR space based on the position of the imaging part 120.

Then, using the position of the virtual object in the AR space based on the position of the imaging part 120, the display controller 115 can grasp the size of the virtual object in the AR space from the size of the virtual object in the image. In the case where the real size of the virtual object is registered as the known data, the display controller 115 can determine whether the size of the virtual object in the AR space has reached the real size of the virtual object by comparing the real size of the virtual object with the size of the virtual object in the AR space.

Since a size of a virtual object in an image is generally determined in accordance with a size of a real object in the image, it was necessary, in order to place the virtual object having a desired size in the AR space, to adjust the size of the real object in the real space or to adjust the size of the real object shown in the image. With the size control on the virtual object according to the present embodiment, it becomes possible to place the virtual object having a desired size in the AR space in accordance with the user operation.

Figure 17:
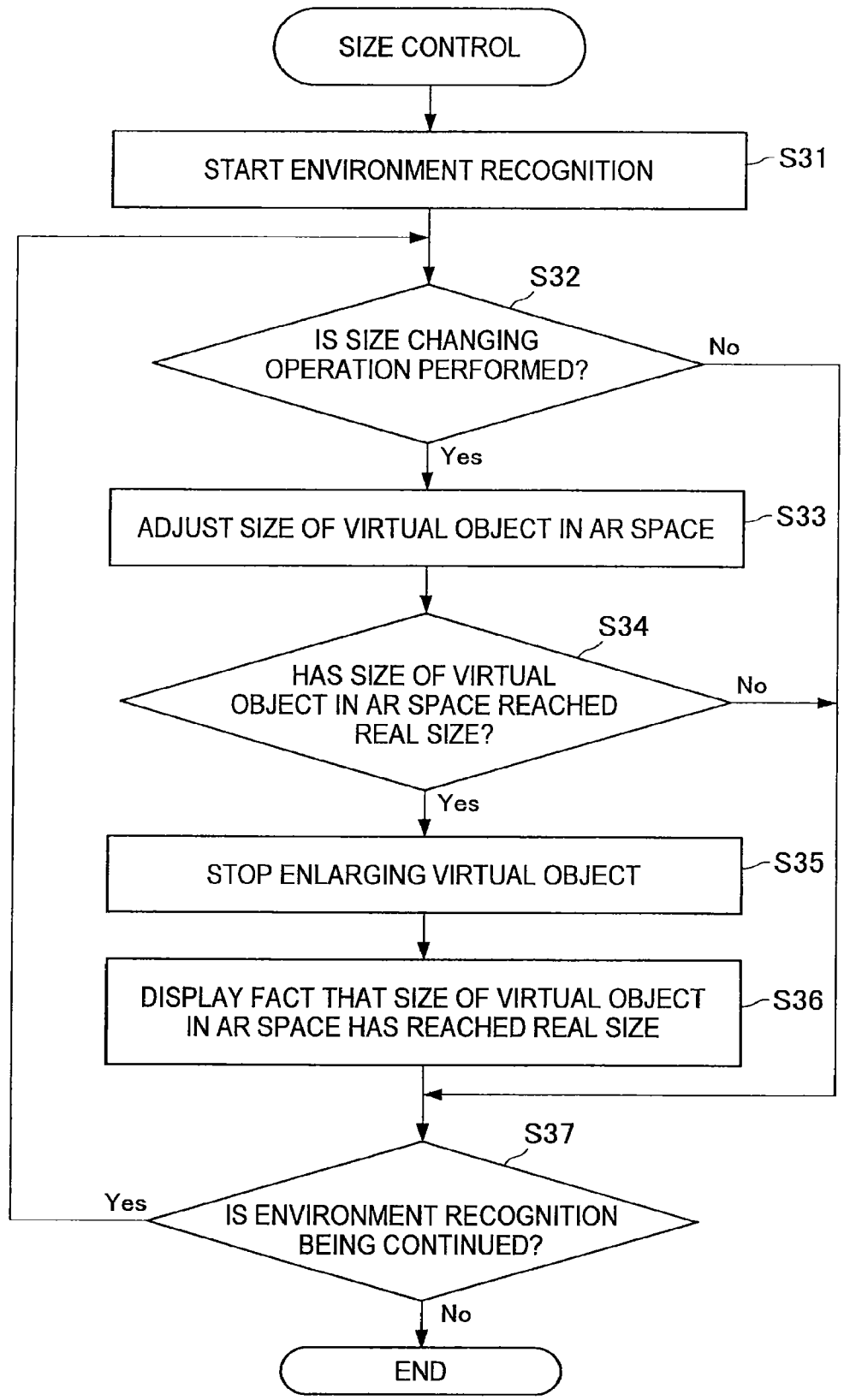
FIG. 17 is a flowchart showing an operation example of controlling a size of a virtual object.

FIG. 17 is a flowchart showing an operation example of controlling a size of a virtual object. First, the environment recognition part 114 starts environment recognition (S31), and the operation acquisition part 111 acquires a user operation. In the case where there is no size changing operation ("No" in S32), the controller 110 proceeds to S37.

On the other hand, in the case where there is a size changing operation ("Yes" in S32), the display controller adjusts the size of the virtual object in the AR space (S33), and in the case where the size of the virtual object in the AR space has not reached the real size ("No" in S34), the controller 110 proceeds to S37. On the other hand, in the case where the size of the virtual object in the AR space has reached the real size ("Yes" in S34), the display controller 115 stops enlarging the virtual object (S35), causes the fact that the size of the virtual object in the AR space has reached the real size to be displayed (S36), and the controller 110 proceeds to S37.

In the case where the environment recognition performed by the environment recognition part 114 is not continued ("No" in S37), the controller 110 may complete the operation, and in the case where the environment recognition performed by the environment recognition part 114 is being continued ("Yes" in S37), the processing may return to step S31.

Heretofore, the case where the number of virtual objects is one has been described, but there may be a case where the number of virtual objects may be two or more. In such a case, the sizes of some of the multiple virtual objects may be adjusted, or the sizes of all the multiple virtual objects may be adjusted. For example, the display controller 115 may select a virtual object the size of which is to be changed in accordance with the distances from the imaging part 120 to the respective virtual objects.

Figure 18:
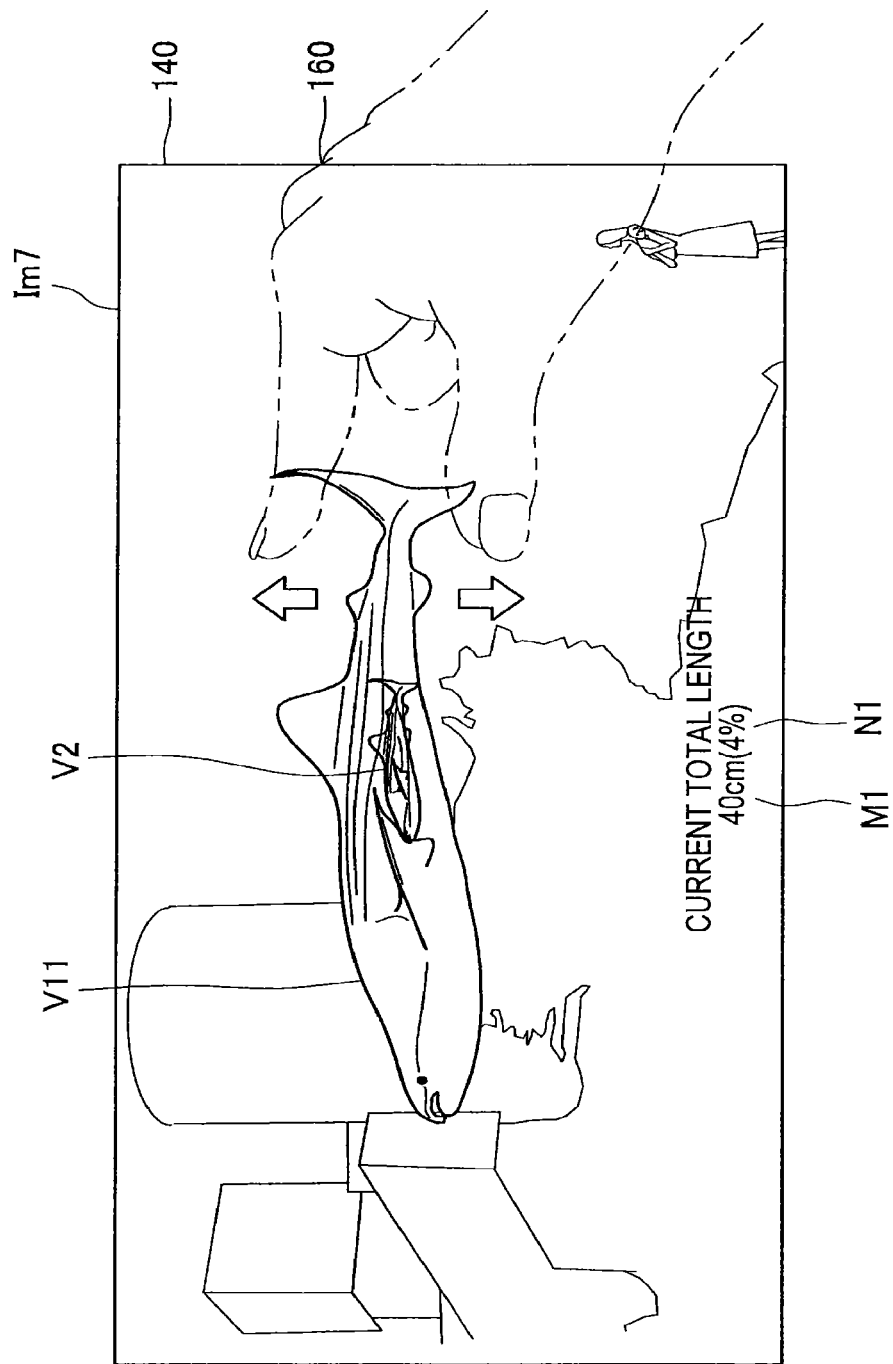
FIG. 18 is a diagram showing a display example of before enlargement of one virtual object in a case where the one virtual object out of multiple virtual objects is to be enlarged within an augmented reality space.
Figure 19:
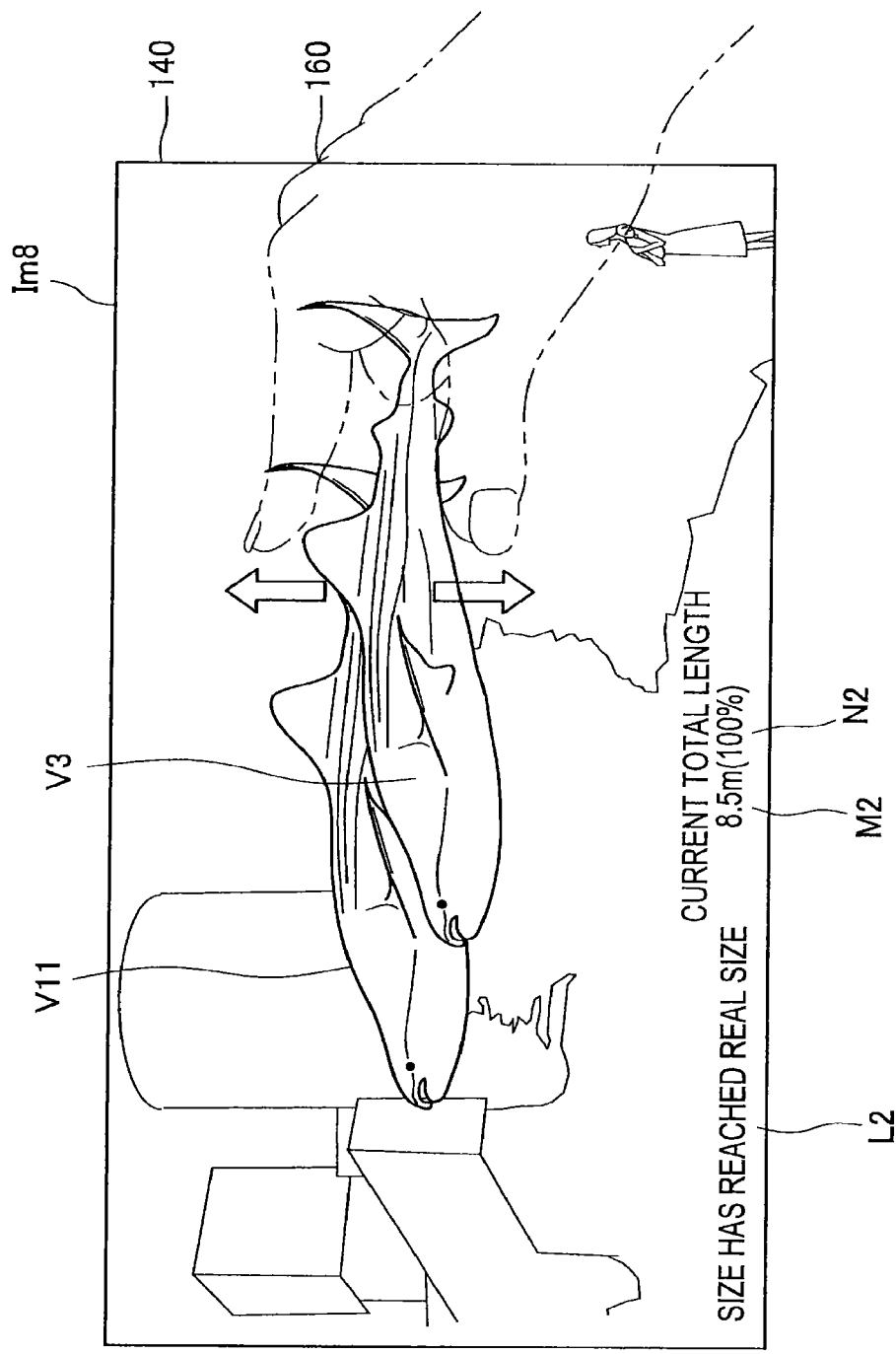
FIG. 19 is a diagram showing a display example of after enlargement of one virtual object in a case where the one virtual object out of multiple virtual objects is enlarged within an augmented reality space.

FIG. 18 is a diagram showing a display example of before enlargement of the virtual object V2 in the case where the virtual object V2 out of virtual objects V11 and V2 is to be enlarged within the AR space. Referring to FIG. 18, an image Im7 is captured. FIG. 19 is a diagram showing a display example of after enlargement of the virtual object V2. Referring to FIG. 18, an image Im8 is captured. In the examples shown in those figures, the display controller 115 selects the virtual object that is the nearest from the imaging part 120 (virtual object placed at the nearest side when seen from the imaging part 120) as the target the size of which is to be changed.

In this case, for example, the virtual object that is the nearest from the imaging part 120 may be displayed in a mode which can be distinguished from the other virtual objects. For example, the virtual object that is the nearest from the imaging part 120 may be displayed in a manner that the virtual object has a motion and the other virtual objects may be displayed in a manner that they stand still. However, the technique for adjusting sizes of some of the multiple virtual objects is not limited thereto.

For example, in the case where the user Ua conducts a selection operation, the display controller 115 may select a virtual object the size of which is to be changed on the basis of the selection operation. The selection operation is not limited, and may be a tap operation, for example. Alternatively, in the case where the size changing operation is a pinch-open operation or a pinch-close operation, the display controller 115 may select the virtual object that is directly specified by the operating object in the course of the pinch-open operation or the pinch-close operation.

Heretofore, "Size control on virtual object" has been described.

[1-6. Hardware Configuration Example]

Figure 20:
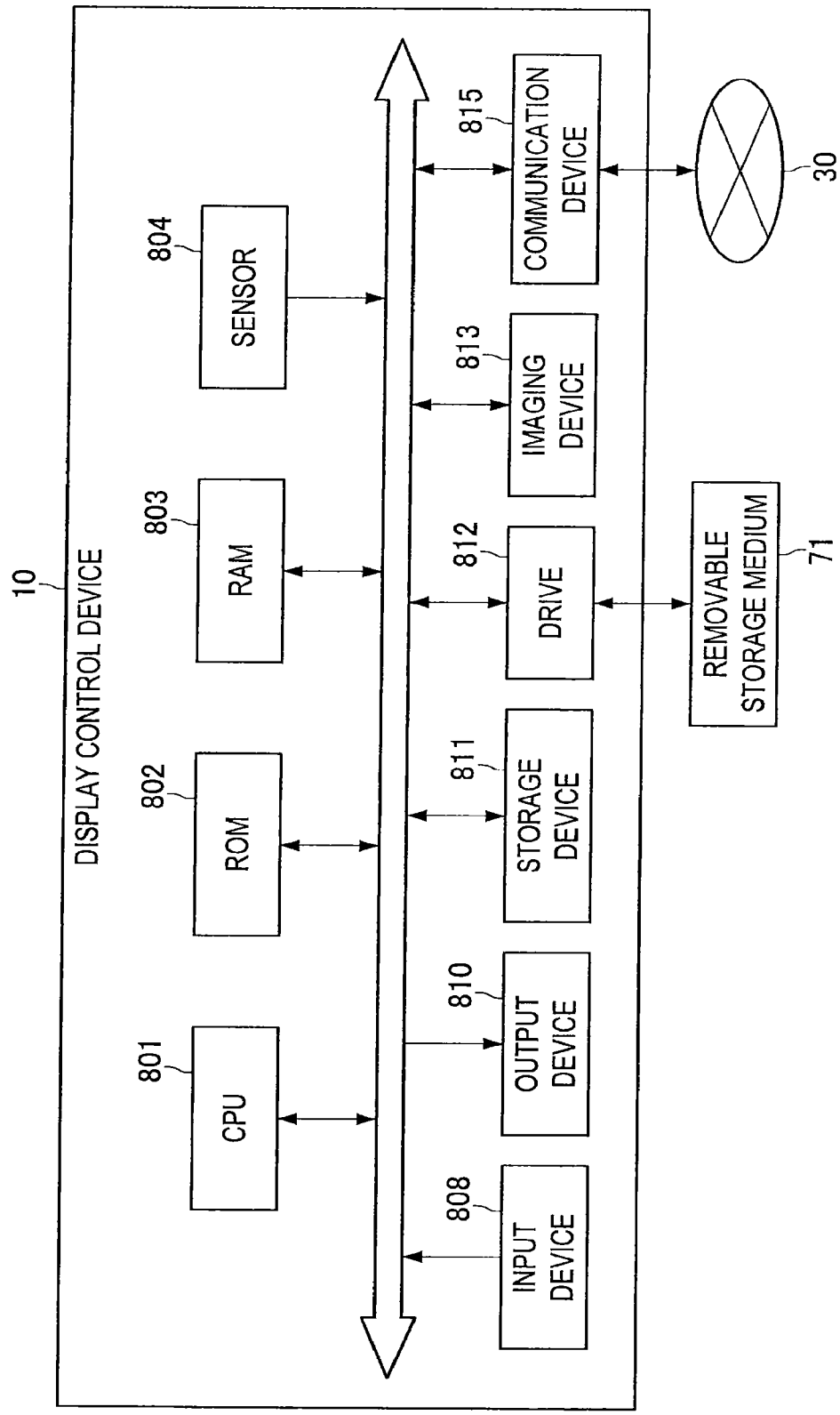
FIG. 20 is a diagram showing a hardware configuration example of a display control device according to an embodiment of the present disclosure.

Next, a hardware configuration example of the display control device 10 according to an embodiment of the present disclosure will be described. FIG. 20 is a diagram showing a hardware configuration example of the display control device 10 according to an embodiment of the present disclosure. It should be noted that the hardware configuration example shown in FIG. 20 is merely an example of a hardware configuration of the display control device 10. Accordingly, the hardware configuration of the display control device 10 is not limited to the example shown in FIG. 20.

As shown in FIG. 20, the display control device 10 includes a central processing unit (CPU) 801, read only memory (ROM) 802, random access memory (RAM) 803, a sensor 804, an input device 808, an output device 810, a storage device 811, a drive 812, an imaging device 813, and a communication device 815.

The CPU 801 functions as an arithmetic processing unit and a control unit, and controls entire operation of the display control device 10 in accordance with various programs. Further, the CPU 801 may be a microprocessor. The ROM 802 stores a program, a calculation parameter, and the like used by the CPU 801. The RAM 803 temporarily stores a program used in execution of the CPU 801, a parameter varying as appropriate during the execution, and the like. The CPU 801, the ROM 802, and the RAM 803 are connected with each other via the host bus configured from a CPU bus or the like.

The sensor 804 includes various types of detection sensors such as a terminal state detection sensor for detecting states of the display control device 10, and a peripheral circuit thereof. Examples of the sensor 804 include a tilt sensor, an acceleration sensor, an orientation sensor, a temperature sensor, a humidity sensor, and a light intensity sensor. A detection signal obtained by the sensor 804 is transmitted to the CPU 801. In this way, the CPU 801 can know the states (tilt, acceleration, orientation, temperature, humidity, light intensity, and the like) of the display control device 10.

The input device 808 is configured from, for example, an input part for inputting information by a user, such as a mouse, a keyboard, a touch panel, a button, a microphone, a switch, and a lever, and an input control circuit which generates an input signal based on the input by the user and outputs the generated input signal to the CPU 801. The user of the display control device 10 can input various kinds of data to the display control device 10 and can instruct the display control device 10 to perform a processing operation by operating the input device 808.

The output device 810 includes, for example, display devices such as a liquid crystal display (LCD) device, an organic light emitting diode (OLED) device, and a lamp. Further, the output device 810 includes audio output devices such as a speaker and headphones. For example, the display devices each display a captured image, a generated image, and the like. On the other hand, the audio output devices each convert audio data and the like into audio and output the audio.

The storage device 811 is a device for storing data, which is configured as an example of a storage of the display control device 10. The storage device 811 may include, for example, a storage medium, a recording device for recording data in the storage medium, a reading device for reading out the data from the storage medium, and a deletion device for deleting the data recorded in the storage medium. The storage device 811 stores a program and various data executed by the CPU 801.

The drive 812 is a reader/writer for the storage medium and is built in or externally attached to display control device 10. The drive 812 reads out information recorded in a removable storage medium 71 which is mounted thereto, such as a magnetic disk, an optical disc, a magneto-optical disk, or semiconductor memory, and outputs the information to the RAM 803. Further, the drive 812 can also write information in the removable storage medium 71.

The imaging device 813 includes an imaging optical system, such as a shooting lens and a zoom lens for focusing light, and a signal conversion device, such as a charge coupled device (CCD) or a complementary metal oxide semiconductor (CMOS). The imaging optical system focuses light emitted from a subject and forms an image of the subject on a signal conversion part, and the signal conversion device converts the formed image of the subject into an electrical image signal.

The communication device 815 is a communication interface which is configured from, for example, a communication device for establishing a connection with a network. In addition, the communication device 815 may be a wireless local area network (LAN) enabled communication device, a long term evolution (LTE) enabled communication device, or a wired communication device for performing wired communication. The communication device 815 can communicate with other devices via a network 30.

Heretofore, a hardware configuration example of the display control device 10 according to an embodiment of the present disclosure has been described.

2. CONCLUSION

As described above, according to the embodiments of the present disclosure, there is provided the display control device 10 including the display controller 115 configured to place a virtual object within an AR space corresponding to a real space in accordance with a recognition result of a real object A1 shown in an image captured by the imaging part 120, and the operation acquisition part 111 configured to capture a user operation. In the case where the user operation is a first operation, the display controller 115 moves the virtual object within the AR space. According to such a configuration, it becomes possible to change a position of the virtual object placed in the AR space in accordance with a user's intention.

Further, according to the position/attitude control and the size control on the virtual object of an embodiment of the present disclosure, when the user Ua performs an operation of enlarging a virtual object up to a real size, for example, there may occur a case where it is necessary for the user Ua to move away from the virtual object in order to fit the virtual object within the imaging range in the process of the operation of enlarging the virtual object. By making the user Ua perform such an operation, it becomes possible for allowing the user Ua to grasp the real size of the virtual object more intuitively.

In an embodiment of the present disclosure, as a scene for moving the virtual object within the AR space and adjusting the size of the virtual object, the scene is mainly assumed where a photograph is taken in which a virtual object is fit within the imaging range. However, an embodiment of the present disclosure may be applied to any scene other than such a scene. For example, an embodiment of the present disclosure can be effectively applied also to a scene in which a virtual object which appears in a game application is moved within the AR space and the size of the virtual object is adjusted.

Further, in an embodiment of the present disclosure, the description has been mainly made of the example that the result of controlling the virtual object by the display control device 10 is reflected in the AR space of the display control device 10. However, for example, in the case where a single AR space is shared between the display control device 10 and other devices, the result of controlling the virtual object by the display control device 10 may be reflected in the AR space of the other devices which are communicable with the display control device 10.

It should be understood by those skilled in the art that various modifications, combinations, sub-combinations and alterations may occur depending on design requirements and other factors insofar as they are within the scope of the appended claims or the equivalents thereof.

Further, it is also possible to create a program for causing hardware such as a CPU, ROM, and RAM, which are built in a computer, to exhibit substantially the same functions as those of respective structures of the display control device 10 described above. Further, there is also provided a non-transitory computer-readable recording medium having the program recorded thereon.

Additionally, the present technology may also be configured as below.

(1) A display control device including:

a display controller configured to place a virtual object within an augmented reality space corresponding to a real space in accordance with a recognition result of a real object shown in an image captured by an imaging part; and an operation acquisition part configured to acquire a user operation, wherein, when the user operation is a first operation, the display controller causes the virtual object to move within the augmented reality space.

(2) The display control device according to (1),
wherein, when the user operation is the first operation, the display controller causes the virtual object to move within the augmented reality space under a state where a relative position relationship between the imaging part and the virtual object is maintained.
(3) The display control device according to (1) or (2),
wherein, when the user operation is the first operation, the display controller causes one or a plurality of virtual objects specified by the first operation to move within the augmented reality space.
(4) The display control device according to any one of (1) to (3),
wherein, while the display controller causes the virtual object to move within the augmented reality space, the display controller causes a fact that the virtual object is being moved to be displayed.
(5) The display control device according to any one of (1) to (4),
wherein, while the first operation is not being performed, the display controller fixes the virtual object within the augmented reality space.
(6) The display control device according to (5),
wherein, while the first operation is not being performed, the display controller causes a size of the virtual object in the image to be changed in accordance with a distance between the imaging part and the virtual object.
(7) The display control device according to (5),
wherein, while the first operation is not being performed, the display controller causes an attitude of the virtual object in the image to be changed in accordance with an attitude of the virtual object based on the imaging part.
(8) The display control device according to any one of (1) to (7),
wherein the display controller controls the virtual object on a basis of an environment of the virtual object at a destination.
(9) The display control device according to (8),
wherein, when the environment of the virtual object at the destination is a movement-incapable region, the display controller causes a position of the virtual object to be shifted to a movement-capable region.
(10) The display control device according to any one of (1) to (9),
wherein the first operation includes an operation of specifying the virtual object using one or a plurality of operating objects.
(11) The display control device according to (1),
wherein, when the user operation is a second operation, the display controller changes a size of the virtual object in the augmented reality space on a basis of the second operation.
(12) The display control device according to (11),
wherein, when the size of the virtual object in the augmented reality space has reached a real size of the virtual object, the display controller stops enlarging the virtual object.
(13) The display control device according to (11) or (12),
wherein, when the size of the virtual object in the augmented reality space has reached a real size of the virtual object, the display controller causes a fact that the size of the virtual object in the augmented reality space has reached the real size of the virtual object to be displayed.
(14) The display control device according to any one of (11) to (13),
wherein the display controller determines whether the size of the virtual object in the augmented reality space has reached a real size of the virtual object on a basis of known data related to a real size of the real object, a size of the real object in the image, and known data related to the real size of the virtual object.
(15) The display control device according to any one of (11) to (14),
wherein, when a selection operation is performed, the display controller selects a virtual object a size of which is to be changed on a basis of the selection operation.
(16) The display control device according to any one of (11) to (14),
wherein the display controller selects a virtual object a size of which is to be changed in accordance with distances from the imaging part and the respective one or plurality of virtual objects.
(17) The display control device according to any one of (11) to (16),
wherein the second operation includes an operation of making a distance between a plurality of operating objects larger.
(18) The display control device according to (1),
wherein the display controller places the virtual object in a manner that the virtual object has an attitude corresponding to a gravity vector.
(19) A display control method including:
placing a virtual object within an augmented reality space corresponding to a real space in accordance with a recognition result of a real object shown in an image captured by an imaging part;
acquiring a user operation; and
causing the virtual object to move within the augmented reality space when the user operation is a first operation.
(20) A non-transitory computer-readable recording medium having a program recorded thereon, the program being for causing a computer to function as a display control device including
a display controller configured to place a virtual object within an augmented reality space corresponding to a real space in accordance with a recognition result of a real object shown in an image captured by an imaging part, and
an operation acquisition part configured to acquire a user operation,
wherein, when the user operation is a first operation, the display controller causes the virtual object to move within the augmented reality space.

What is claimed is:
1. A display control device comprising:
an image capturing device configured to capture an image of a real space;
a touch sensor configured to detect a user operation;
a display configured to display the image captured by the image capturing device; and
a display controller configured to place a virtual object within an augmented reality space corresponding to the real space in accordance with a recognition result of a real object in the real space, the virtual object displayed by being superimposed on the image,
wherein the display controller is further configured to move the virtual object within the augmented reality space in accordance with the user operation which is a touch operation specifying the virtual object, and control a movement of the virtual object within the augmented reality space on a basis of an environment of a destination of the real space corresponding to a position of the augmented reality space where the virtual object is moved in accordance with the user operation.

2. The display control device according to claim 1,
wherein the display controller causes a display position of the virtual object to be shifted on a basis of the environment of the real space corresponding to a where the virtual object is moved in accordance with the user operation.

3. The display control device according to claim 1,
wherein the display controller causes a display position of the virtual object to be shifted to a movement-capable region on a basis of the environment of the virtual object at the destination.

4. The display control device according to claim 3,
wherein, in a case where the environment of the virtual object at the destination is a movement-incapable region, the display controller causes the display position of the virtual object to be shifted to a movement-capable region on a basis of the environment of the virtual object at the destination.

5. The display control device according to claim 1,
wherein the display controller causes the virtual object to move within the augmented reality space in accordance with a change of a position and attitude of the image capturing device.

6. The display control device according to claim 5,
wherein the display controller causes the virtual object to move within the augmented reality space under a state where a relative position relationship between the image capturing device and the virtual object is maintained.

7. The display control device according to claim 1,
wherein the display controller causes the virtual object to move within the augmented reality space with a predetermined motion.

8. The display control device according to claim 1,
wherein the user operation is an operation specifying the virtual object and includes using one or more operating objects to specify the virtual object.

9. The display control device according to claim 8,
wherein the operation specifying the virtual object includes an operation of tapping the virtual object.

10. The display control device according to claim 1,
wherein the display control device is a smartphone.

11. The display control device according to claim 1,
wherein the display controller is further configured to change a size of the virtual object based on an operation of changing a distance between multiple operating objects detected by the touch sensor.

12. The display control device according to claim 11,
wherein the display controller is further configured to limit a size change of the virtual object.

13. The display control device according to claim 11,
wherein the operation of changing a distance between multiple operation objects is pinch-open operation.

14. The display control device according to claim 1,
wherein the display controller places the virtual object in a manner that the virtual object has an attitude corresponding to a gravity vector.

15. The display control device according to claim 1,
wherein the display controller places the virtual object in accordance with a position and attitude of the real object.

16. The display control device according to claim 1,
wherein the display controller causes the virtual object to perform a predetermined motion on a basis of the environment of the virtual object at the destination.

17. A display control method comprising:
capturing an image of a real space;
detecting a user operation;
displaying the image;
placing a virtual object within an augmented reality space corresponding to the real space in accordance with a recognition result of a real object in the real space, the virtual object displayed by being superimposed on the image;
moving the virtual object within the augmented reality space in accordance with the user operation which is a touch operation specifying the virtual object; and
controlling a movement of the virtual object within the augmented reality space on a basis of an environment of a destination of the real space corresponding to a position of the augmented reality space where the virtual object is moved in accordance with the user operation.

18. A non-transitory computer-readable medium having embodied thereon a program, which when executed by a computer, causes the computer to execute a method, the method comprising:
capturing an image of a real space;
detecting a user operation;
displaying the image;
placing a virtual object within an augmented reality space corresponding to the real space in accordance with a recognition result of a real object in the real space, the virtual object displayed by being superimposed on the image;
moving the virtual object within the augmented reality space in accordance with the user operation which is a touch operation specifying the virtual object; and
controlling a movement of the virtual object within the augmented reality space on a basis of an environment of a destination of the real space corresponding to a position of the augmented reality space where the virtual object is moved in accordance with the user operation.

* * * * *